United States Patent
Lee et al.

(10) Patent No.: US 12,027,163 B2
(45) Date of Patent: Jul. 2, 2024

(54) ELECTRONIC DEVICE AND OPERATION METHOD THEREOF

(71) Applicant: Samsung Electronics Co., Ltd., Suwon-si (KR)

(72) Inventors: Hoyeong Lee, Suwon-si (KR); Kyounghoon Lee, Suwon-si (KR); Suneung Park, Suwon-si (KR); Dooho Byun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 17/310,323

(22) PCT Filed: Jun. 29, 2021

(86) PCT No.: PCT/KR2021/008188
§ 371 (c)(1),
(2) Date: Jul. 27, 2021

(87) PCT Pub. No.: WO2022/025448
PCT Pub. Date: Feb. 3, 2022

(65) Prior Publication Data
US 2022/0028381 A1    Jan. 27, 2022

(30) Foreign Application Priority Data

Jul. 27, 2020 (KR) .......................... 10-2020-0093214

(51) Int. Cl.
*G10L 15/22* (2006.01)
*G06F 3/14* (2006.01)
*H04W 4/02* (2018.01)

(52) U.S. Cl.
CPC ................ *G10L 15/22* (2013.01); *G06F 3/14* (2013.01); *H04W 4/027* (2013.01); *G10L 2015/223* (2013.01)

(58) Field of Classification Search
CPC ............... G10L 15/22; G10L 2015/223; G10L 2015/228; G10L 15/00; G10L 15/063;
(Continued)

(56) References Cited

U.S. PATENT DOCUMENTS 8,325,354 B2 * 12/2012 Yoshida ............... H04N 1/0035
358/1.18
9,230,538 B2 *  1/2016 Maruta .................... G10L 15/20
(Continued)

FOREIGN PATENT DOCUMENTS

JP  2005-122042 A   5/2005
JP  2008-227771 A   9/2008
(Continued)

*Primary Examiner* — Vijay B Chawan

(57) ABSTRACT

According to an embodiment an electronic device includes at least one sensor, a display, a memory, and a processor operatively connected to the at least one sensor, the display, and the memory. The memory is configured to store instructions that, when executed, the processor is configured to recognize a context of a user by using the at least one sensor based on at least one of a speed of the electronic device, a location of the electronic device, a level of external noise, an external illuminance, personal information of the user, or a connection state between the electronic device and an external electronic device. The processor is also configured to control an execution environment of a voice assistant application based on the recognized context.

19 Claims, 13 Drawing Sheets

(58) Field of Classification Search
CPC ..... G10L 15/1815; G10L 25/84; G10L 15/16; G10L 15/1822; G10L 15/20; G10L 15/25
See application file for complete search history.

(56) References Cited

U.S. PATENT DOCUMENTS

| | | | | |
|---|---|---|---|---|
| 9,639,322 B2* | 5/2017 | Osawa | ............... | G01C 21/3608 |
| 10,276,162 B2* | 4/2019 | Choudhury | ............. | G10L 15/22 |
| 10,354,011 B2* | 7/2019 | Nell | ........................ | G06F 40/35 |
| 11,003,414 B2* | 5/2021 | Choi | ....................... | G06F 3/165 |
| 11,468,890 B2* | 10/2022 | Gada | ........................ | G10L 15/22 |
| 2014/0163976 A1* | 6/2014 | Park | ........................ | G10L 15/22 |
| | | | | 704/231 |
| 2014/0257808 A1* | 9/2014 | Gil | ........................... | G10L 15/22 |
| | | | | 704/235 |
| 2017/0357478 A1* | 12/2017 | Piersol | ..................... | G10L 15/22 |
| 2018/0061413 A1* | 3/2018 | Tanabe | .................... | G06F 3/167 |
| 2018/0166044 A1* | 6/2018 | Heo | ...................... | G04G 9/0064 |
| 2020/0105264 A1 | 4/2020 | Jang et al. | | |
| 2020/0193992 A1* | 6/2020 | Kim | ......................... | H04N 23/60 |
| 2022/0028381 A1* | 1/2022 | Lee | .......................... | G06F 3/167 |
| 2023/0142110 A1* | 5/2023 | Kim | ......................... | G06F 3/167 |
| | | | | 704/235 |

FOREIGN PATENT DOCUMENTS

| | | |
|---|---|---|
| JP | 2013-203327 A | 10/2013 |
| JP | 5709980 B2 | 4/2015 |
| KR | 10-2008-0016055 A | 2/2008 |
| KR | 10-1755376 B1 | 7/2017 |
| KR | 10-1975566 B1 | 5/2019 |
| KR | 10-2019-0106916 A | 9/2019 |
| KR | 10-2048375 B1 | 11/2019 |
| KR | 10-2022-0005348 A | 1/2022 |

* cited by examiner

ELECTRONIC DEVICE AND OPERATION METHOD THEREOF

CROSS-REFERENCE TO RELATED APPLICATIONS

This application is a 371 National Stage of International Application No. PCT/KR2021/008188, filed Jun. 29, 2021, which claims priority to Korean Patent Application No. 10-2020-0093214, filed Jul. 27, 2020, the disclosures of which are herein incorporated by reference in their entirety.

BACKGROUND

1. Field

Various embodiments disclosed in this specification relate to an electronic device and an operating method thereof.

2. Description of Related Art

In addition to a conventional input method using a keyboard or a mouse, electronic devices have recently supported various input methods such as a voice input and the like. For example, the electronic devices such as smart phones and tablet PCs provide a voice assistant application that receives a user utterance and performs an operation corresponding to the received user utterance.

SUMMARY

It is difficult for a conventional electronic device to provide convenience to a user who employs a voice assistant application in various environments.

Various embodiments disclosed in the specification are intended to provide an electronic device including the voice assistant application that improves user convenience.

Various embodiments disclosed in the specification are intended to provide an electronic device that controls an execution environment of the voice assistant application based on a context of the electronic device or a user's context.

According to an embodiment disclosed in the specification, an electronic device may include at least one sensor, a display, a memory, and a processor operatively connected to the at least one sensor, the display, and the memory. According to an embodiment, the memory may store instructions that, when executed, cause the processor to recognize a context of a user by using the at least one sensor based on at least one of a speed of the electronic device, a location of the electronic device, a level of external noise, an external illuminance, personal information of the user, or a connection state between the electronic device and an external electronic device, and to control an execution environment of a voice assistant application based on the recognized context.

Furthermore, according to an embodiment disclosed in the specification, an operating method of an electronic device may include recognizing a context of the user by using at least one sensor based on at least one of a speed of the electronic device, a location of the electronic device, a level of external noise, an external illuminance, personal information of the user, or a connection state between the electronic device and an external electronic device and controlling an execution environment of a voice assistant application based on the recognized context.

According to various embodiments disclosed in the specification, it is possible to provide an electronic device including a voice assistant application that improves user convenience.

According to various embodiments disclosed in the specification, it is possible to provide an electronic device that controls an execution environment of the voice assistant application based on a context of the electronic device or a user's context.

Besides, a variety of effects directly or indirectly understood through the specification may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to description of drawings, the same or similar components will be marked by the same or similar reference signs.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
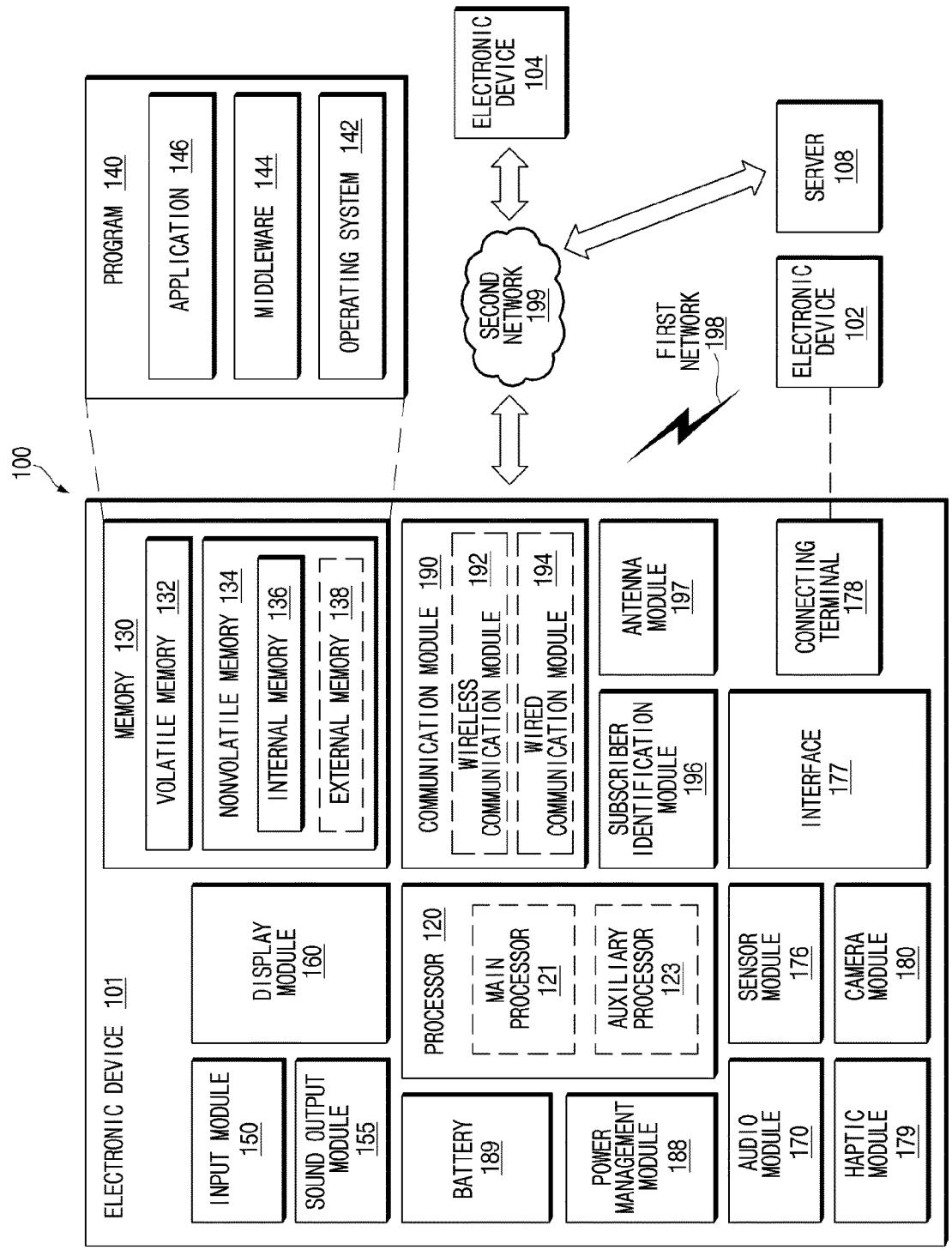
FIG. 1 illustrates a block diagram of an electronic device in a network environment, according to various embodiments.

FIG. 1 illustrates a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In an embodiment, some (e.g., a sensor module 176, a camera module 180, or an antenna module 197) of the components may be implemented as single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural network processing unit) may include a hardware structure specialized to process an artificial intelligence model. The artificial intelligence model may be generated through machine learning. For example, the learning may be performed in the electronic device 101, in which an artificial intelligence program is performed, or may be performed through a separate server (e.g., server 108). For example, the learning algorithm may include supervised learning, unsupervised learning, semi-supervised learning, or reinforcement learning, but may not be limited to the above example. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above-described networks, but may not be limited to the above-described example. In addition to a hardware structure, additionally or alternatively, the artificial intelligence model may include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a sensor (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network and a next-generation communication technology after a 4G network, for example, a new radio (NR) access technology. The NR access technology may support high-speed transmission of high-capacity data (enhanced mobile broadband (eMBB)), terminal power minimization and connection of multiple terminals (massive machine type communications (mMTC)), or ultra-reliable and low-latency communications (URLLC). For example, the wireless communication module 192 may support a high frequency band (e.g., mmWave band) to achieve a high data transfer rate. The wireless communication module 192 may support various technologies for securing performance in a high frequency band, for example, technologies such as beamforming, massive multiple-input and multiple-output (massive MIMO), full dimensional MIMO (FD-MIMO), an array antenna, analog beam-forming, and a large scale antenna. The wireless communication module 192 may support various requirements regulated in the electronic device 101, an external electronic device (e.g., the electronic device 104) or a network system (e.g., the second network 199). According to an embodiment, the wireless communication module 192 may support peak data rate (e.g., 20 Gbps or more) for eMBB implementation, loss coverage (e.g., 164 dB or less) for mMTC implementation, or U-plane latency (e.g., downlink (DL) of 0.5 ms or less and uplink (UL) of 0.5 ms or less, or round trip of 1 ms or less) for URLLC implementation.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas (e.g., an antenna array). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board (PCB), a radio frequency integrated circuit (RFIC), and a plurality of antennas (e.g., an array antenna). The RFIC may be disposed on or adjacent to a first surface (e.g., a bottom surface) of the PCB and may support a specified high frequency band (e.g., mmWave band). The plurality of antennas may be disposed on or adjacent to a second surface (e.g., a top surface or a side surface) of the PCB and may transmit or receive a signal in the specified high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. For example, the electronic device 101 may provide an ultra-low latency service by using distributed computing or mobile edge computing. In another embodiment, the external electronic device 104 may include an Internet of Things (IoT) device. The server 108 may be an intelligent server using machine learning and/or a neural network. According to an embodiment, the external electronic device 104 or the server 108 may be included in the second network 199. The electronic device 101 may be applied to an intelligence service (e.g., a smart home, a smart city, a smart car, or a healthcare) based on 5G communication technology and IoT-related technology.

Figure 2:
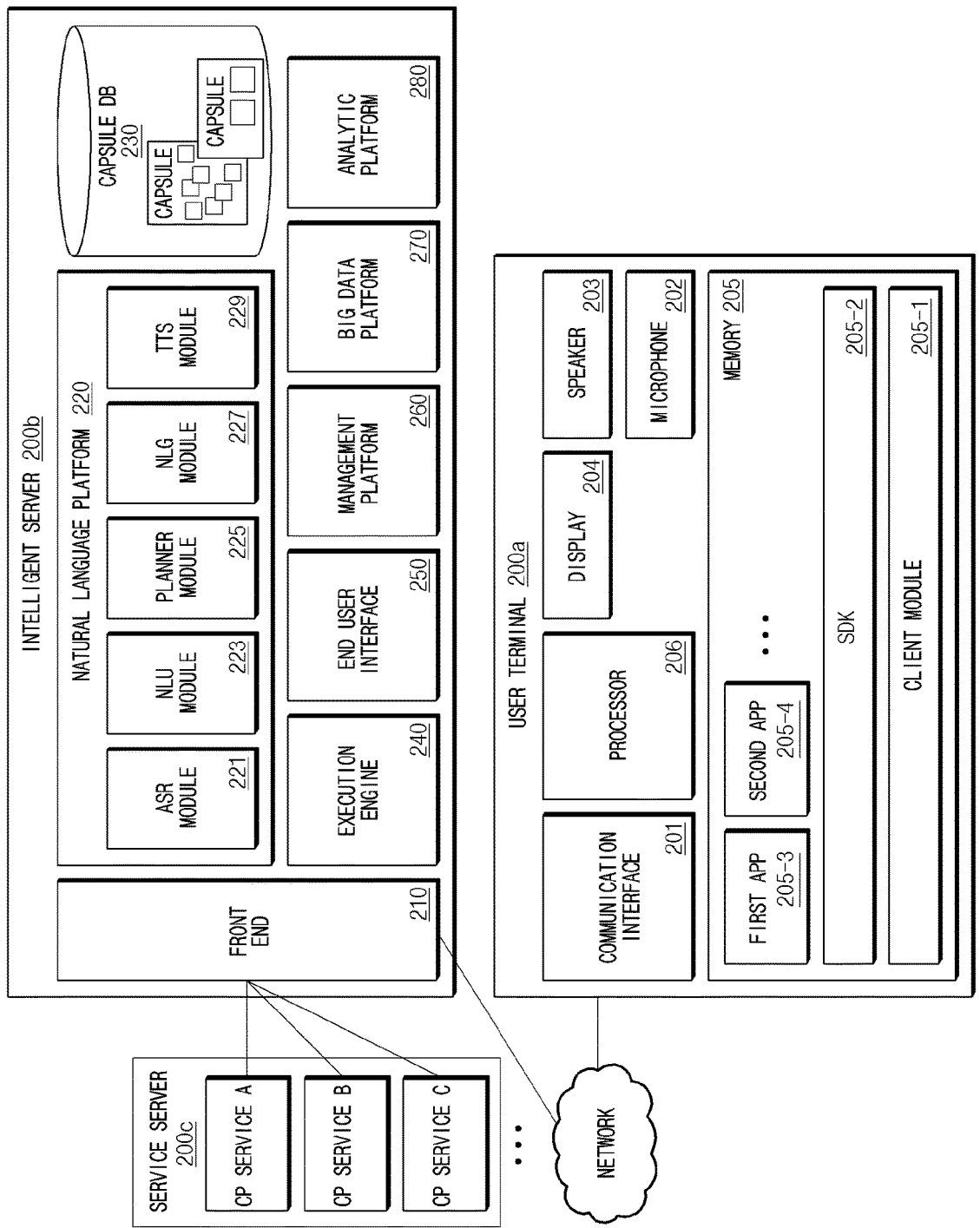
FIG. 2 illustrates a block diagram of an integrated intelligence system, according to an embodiment.

FIG. 2 illustrates a block diagram of an integrated intelligence system, according to various embodiments.

Referring to FIG. 2, an integrated intelligence system according to an embodiment may include a user terminal 200a, an intelligence server 200b, and a service server 200c.

The user terminal 200a according to an embodiment may be a terminal device (or an electronic device) capable of connecting to Internet, and may be, for example, a mobile phone, a smartphone, a personal digital assistant (PDA), a notebook computer, a television (TV), a white household appliance, a wearable device, a head mounted display (HMD), or a smart speaker.

According to the illustrated embodiment, the user terminal 200a may include a communication interface 201, a microphone 202, a speaker 203, a display 204, a memory 205, or a processor 206. The listed components may be operatively or electrically connected to one another.

The communication interface 201 according to an embodiment may be connected to an external device and may be configured to transmit or receive data to or from the external device. The microphone 202 according to an embodiment may receive a sound (e.g., a user utterance) to convert the sound into an electrical signal. The speaker 203 according to an embodiment may output the electrical signal as sound (e.g., voice). The display 204 according to an embodiment may be configured to display an image or a video. The display 204 according to an embodiment may display the graphic user interface (GUI) of the running app (or an application program).

The memory 205 according to an embodiment may store a client module 205-1, a software development kit (SDK) 205-2, and a plurality of apps (205-3, 205-4, . . . ). The client module 205-1 and the SDK 205-2 may constitute a framework (or a solution program) for performing general-purposed functions. Furthermore, the client module 205-1 or the SDK 205-2 may constitute the framework for processing a voice input.

The plurality of apps (205-3, 205-4, . . . ) may be a program for performing the specified function. According to an embodiment, the plurality of apps (205-3, 205-4, . . . ) may include a first app 205_3 and/or a second app 205_4. According to an embodiment, each of the plurality of apps (205-3, 205-4, . . . ) may include a plurality of actions for performing a specified function. For example, the apps may include an alarm app, a message app, and/or a schedule app. According to an embodiment, the plurality of apps (205-3, 205-4, . . . ) may be executed by the processor 206 to sequentially execute at least part of the plurality of actions.

According to an embodiment, the processor 206 may control overall operations of the user terminal 200a. For example, the processor 206 may be electrically connected to the communication interface 201, the microphone 202, the speaker 203, and the display 204 to perform a specified operation. For example, the processor 206 may include at least one processor.

Moreover, the processor 206 according to an embodiment may execute the program stored in the memory 205 to perform a specified function. For example, according to an embodiment, the processor 206 may execute at least one of the client module 205-1 or the SDK 205-2 to perform a following operation for processing a voice input. The processor 206 may control operations of the plurality of apps (205-3, 205-4, . . . ) via the SDK 205-2. The following actions described as the actions of the client module 205-1 or the SDK 205-2 may be the actions performed by the execution of the processor 206.

According to an embodiment, the client module 205-1 may receive a voice input. For example, the client module 205-1 may receive a voice signal corresponding to a user utterance detected through the microphone 202. The client module 205-1 may transmit the received voice input (e.g., a voice input) to the intelligence server 200b. The client module 205-1 may transmit state information of the user terminal 200a to the intelligence server 200b together with the received voice input. For example, the state information may be execution state information of an app.

According to an embodiment, the client module 205-1 may receive a result corresponding to the received voice input. For example, when the intelligence server 200b is capable of calculating the result corresponding to the received voice input, the client module 205-1 may receive the result corresponding to the received voice input. The client module 205-1 may display the received result on the display 204.

According to an embodiment, the client module 205-1 may receive a plan corresponding to the received voice input. The client module 205-1 may display, on the display 204, a result of executing a plurality of actions of an app depending on the plan. For example, the client module 205-1 may sequentially display the result of executing the plurality of actions on a display. For another example, the user terminal 200a may display only a part of results (e.g., a result of the last action) of executing the plurality of actions, on the display.

According to an embodiment, the client module 205-1 may receive a request for obtaining information for calculating the result corresponding to a voice input, from the intelligence server 200b. According to an embodiment, the client module 205-1 may transmit the information to the intelligence server 200b in response to the request.

According to an embodiment, the client module 205-1 may transmit, to the intelligence server 200b, information about the result of executing a plurality of actions depending on the plan. The intelligence server 200b may identify that the received voice input is correctly processed, using the result information.

According to an embodiment, the client module 205-1 may include a speech recognition module. According to an embodiment, the client module 205-1 may recognize a voice input for performing a limited function, via the speech recognition module. For example, the client module 205-1 may launch an intelligence app for processing a specific voice input by performing an organic action, in response to a specified voice input (e.g., wake up!).

According to an embodiment, the intelligence server 200b may receive information associated with a user's voice input from the user terminal 200a over a communication network. According to an embodiment, the intelligence server 200b may convert data associated with the received voice input to text data. According to an embodiment, the intelligence server 200b may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligence server 200b may transmit a result according to the generated plan to the user terminal 200a or may transmit the generated plan to the user terminal 200a. According to an embodiment, the user terminal 200a may display the result according to the plan, on a display. According to an embodiment, the user terminal 200a may display a result of executing the action according to the plan, on the display.

The intelligence server 200b according to an embodiment may include a front end 210, a natural language platform 220, a capsule database 230, an execution engine 240, an end user interface 250, a management platform 260, a big data platform 270, or an analytic platform 280.

According to an embodiment, the front end 210 may receive a voice input received from the user terminal 200a. The front end 210 may transmit a response corresponding to the voice input to the user terminal 200a.

According to an embodiment, the natural language platform 220 may include an automatic speech recognition (ASR) module 221, a natural language understanding (NLU) module 223, a planner module 225, a natural language generator (NLG) module 227, and/or a text to speech module (TTS) module 229.

According to an embodiment, the ASR module 221 may convert the voice input received from the user terminal 200a into text data. According to an embodiment, the NLU module 223 may grasp the intent of the user, using the text data of the voice input. For example, the NLU module 223 may grasp the intent of the user by performing syntactic analysis or semantic analysis. According to an embodiment, the NLU module 223 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 225 may generate the plan by using a parameter and the intent that is determined by the NLU module 223. According to an embodiment, the planner module 225 may determine a plurality of domains for performing a task, based on the determined intent. The planner module 225 may determine a plurality of actions included in each of the plurality of domains determined based on the intent. According to an embodiment, the planner module 225 may determine the parameter for performing the determined plurality of actions or a result value output by the execution of the plurality of actions. The parameter and the result value may be defined as a concept of a specified form (or class). As such, the plan may include the plurality of actions and a plurality of concepts, which are determined by the intent of the user. The planner module 225 may determine the relationship between the plurality of actions and the plurality of concepts stepwise (or hierarchically). For example, the planner module 225 may determine the execution sequence of the plurality of actions, which are determined based on the user's intent, based on the plurality of concepts. In other words, the planner module 225 may determine an execution sequence of the plurality of actions, based on the parameters for performing the plurality of actions and the result output by the execution of the plurality of actions. Accordingly, the planner module 225 may generate a plan including information (e.g., ontology) about the relationship between the plurality of actions and the plurality of concepts. The planner module 225 may generate the plan, using information stored in the capsule DB 230 storing a set of relationships between concepts and actions.

According to an embodiment, the NLG module 227 may change specified information into information in a text form. The information changed to the text form may be in the form of a natural language speech. The TTS module 229 according to an embodiment may change information in the text form to information in a voice form.

According to an embodiment, all or part of the functions of the natural language platform 220 may be also implemented in the user terminal 200*a*.

The capsule DB 230 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 230 may store the plurality of capsules in a form of a concept action network (CAN). According to an embodiment, the plurality of capsules may be stored in the function registry included in the capsule DB 230.

The capsule DB 230 may include a strategy registry that stores strategy information that is used to determine a plan corresponding to a voice input. When there are a plurality of plans corresponding to the voice input, the strategy information may include reference information for determining one plan. According to an embodiment, the capsule DB 230 may include a follow-up registry that stores information of the follow-up action for suggesting a follow-up action to the user in a specified context. For example, the follow-up action may include a follow-up utterance. According to an embodiment, the capsule DB 230 may include a layout registry storing layout information of information output via the user terminal 200*a*. According to an embodiment, the capsule DB 230 may include a vocabulary registry storing vocabulary information included in capsule information. According to an embodiment, the capsule DB 230 may include a dialog registry storing information about dialog (or interaction) with the user. The capsule DB 230 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 230 according to an embodiment may be also implemented in the user terminal 200*a*.

According to an embodiment, the execution engine 240 may calculate a result by using the generated plan. The end user interface 250 may transmit the calculated result to the user terminal 200*a*. Accordingly, the user terminal 200*a* may receive the result and may provide the user with the received result. According to an embodiment, the management platform 260 may manage information used by the intelligence server 200*b*. According to an embodiment, the big data platform 270 may collect data of the user. According to an embodiment, the analytic platform 280 may manage quality of service (QoS) of the intelligence server 200*b*. For example, the analytic platform 280 may manage the component and processing speed (or efficiency) of the intelligence server 200*b*.

According to an embodiment, the service server 200*c* may provide the user terminal 200*a* with a specified service (e.g., ordering food or booking a hotel). According to an embodiment, the service server 200*c* may be a server operated by the third party. According to an embodiment, the service server 200*c* may provide the intelligence server 200*b* with information for generating a plan corresponding to the received voice input. The provided information may be stored in the capsule DB 230. Furthermore, the service server 200*c* may provide the intelligence server 200*b* with result information according to the plan.

In the above-described integrated intelligence system, the user terminal 200*a* may provide the user with various intelligent services in response to a user input. The user input may include, for example, an input through a physical button, a touch input, or a voice input.

According to an embodiment, the user terminal 200*a* may provide a speech recognition service via an intelligence app (or a speech recognition app) stored therein. In this case, for example, the user terminal 200*a* may recognize a user utterance or a voice input, which is received via the microphone, and may provide the user with a service corresponding to the recognized voice input.

According to an embodiment, the user terminal 200*a* may perform a specified action, based on the received voice input, independently, or together with the intelligence server and/or the service server. For example, the user terminal 200*a* may launch an app corresponding to the received voice input and may perform the specified action via the executed app.

According to an embodiment, when providing a service together with the intelligence server 200*b* and/or the service server, the user terminal 200*a* may detect a user utterance by using the microphone 202 and may generate a signal (or voice data) corresponding to the detected user utterance. The user terminal may transmit the voice data to the intelligence server 200*b*, using the communication interface 201.

According to an embodiment, the intelligence server 200*b* may generate a plan for performing a task corresponding to the voice input or the result of performing an action depending on the plan, as a response to the voice input received from the user terminal 200*a*. For example, the plan may include a plurality of actions for performing the task corresponding to the voice input of the user and/or a plurality of concepts associated with the plurality of actions. The concept may define a parameter to be input upon executing the plurality of actions or a result value output by the execution of the plurality of actions. The plan may include relationship information between the plurality of actions and the plurality of concepts.

According to an embodiment, the user terminal 200a may receive the response, using the communication interface 201. The user terminal 200a may output the voice signal generated in the user terminal 200a to the outside by using the speaker 203 or may output an image generated in the user terminal 200a to the outside by using the display 204.

Figure 3:
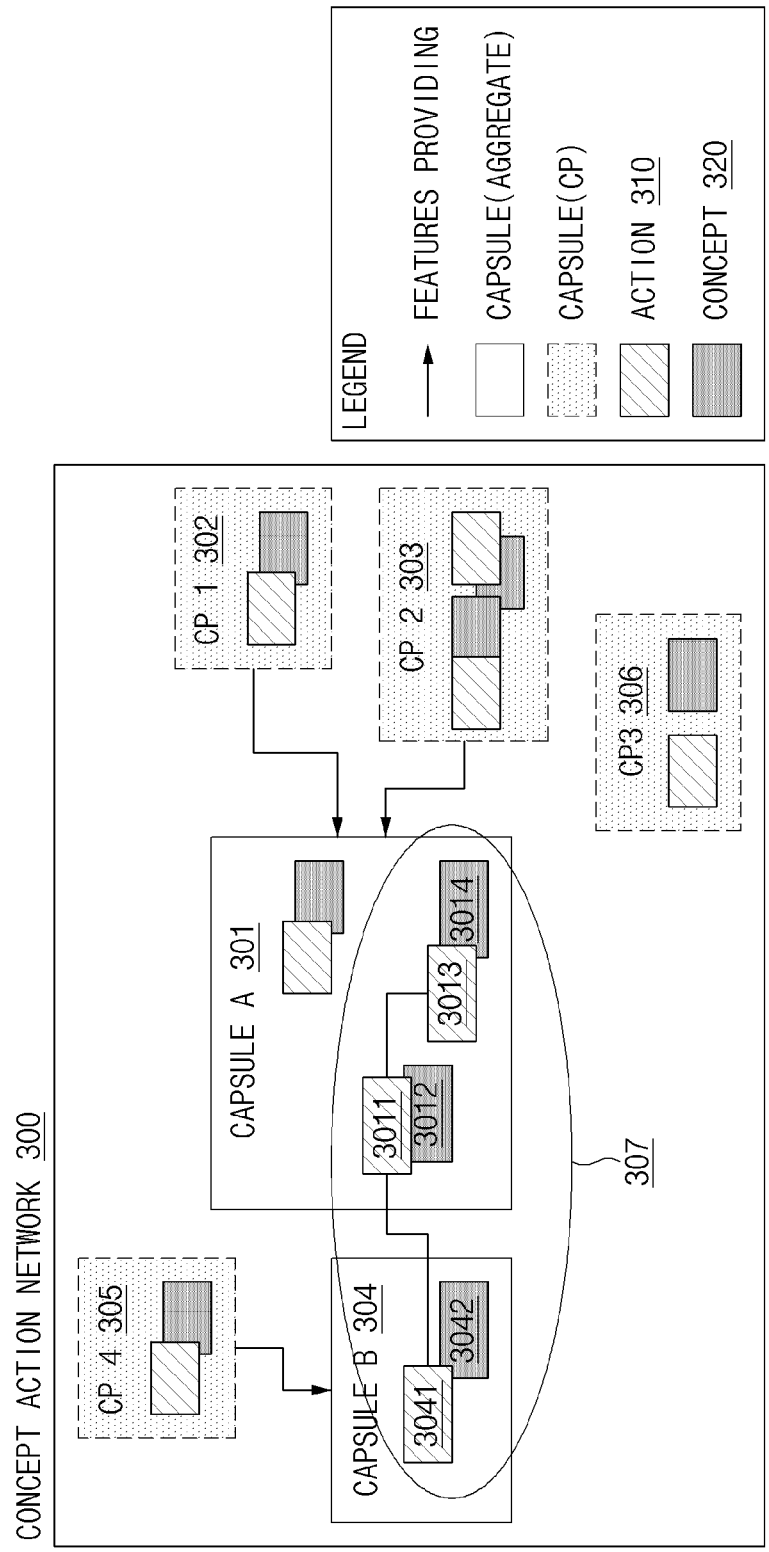
FIG. 3 illustrates a diagram for storing relationship information between a concept and an action in a database, according to various embodiments.

FIG. 3 illustrates a diagram for storing relationship information between a concept and an action in a database, according to various embodiments.

A capsule database (e.g., the capsule DB 230) of the intelligence server 200b may store a capsule in the form of a CAN. The capsule DB may store an action for processing a task corresponding to a user's voice input and a parameter that is used for the action, in the CAN form.

The capsule DB may store a plurality capsules (a capsule A 301 and a capsule B 304) respectively corresponding to a plurality of domains (e.g., applications). According to an embodiment, a single capsule (e.g., the capsule A 301) may correspond to a single domain (e.g., a location (geo) or an application). Furthermore, at least one service provider (e.g., CP 1 302 or CP 2 303) for performing a function for a domain associated with the capsule may correspond to one capsule. According to an embodiment, the single capsule may include at least one or more actions 310 and at least one or more concepts 320 for performing a specified function.

The natural language platform 220 may generate a plan for performing a task corresponding to the received voice input, using the capsule stored in a capsule database. For example, the planner module 225 of the natural language platform may generate the plan by using the capsule stored in the capsule database. For example, a plan 307 may be generated by using actions 3011 and 3013 and concepts 3012 and 3014 of the capsule A 301 and an action 3041 and a concept 3042 of the capsule B 304.

Figure 4:
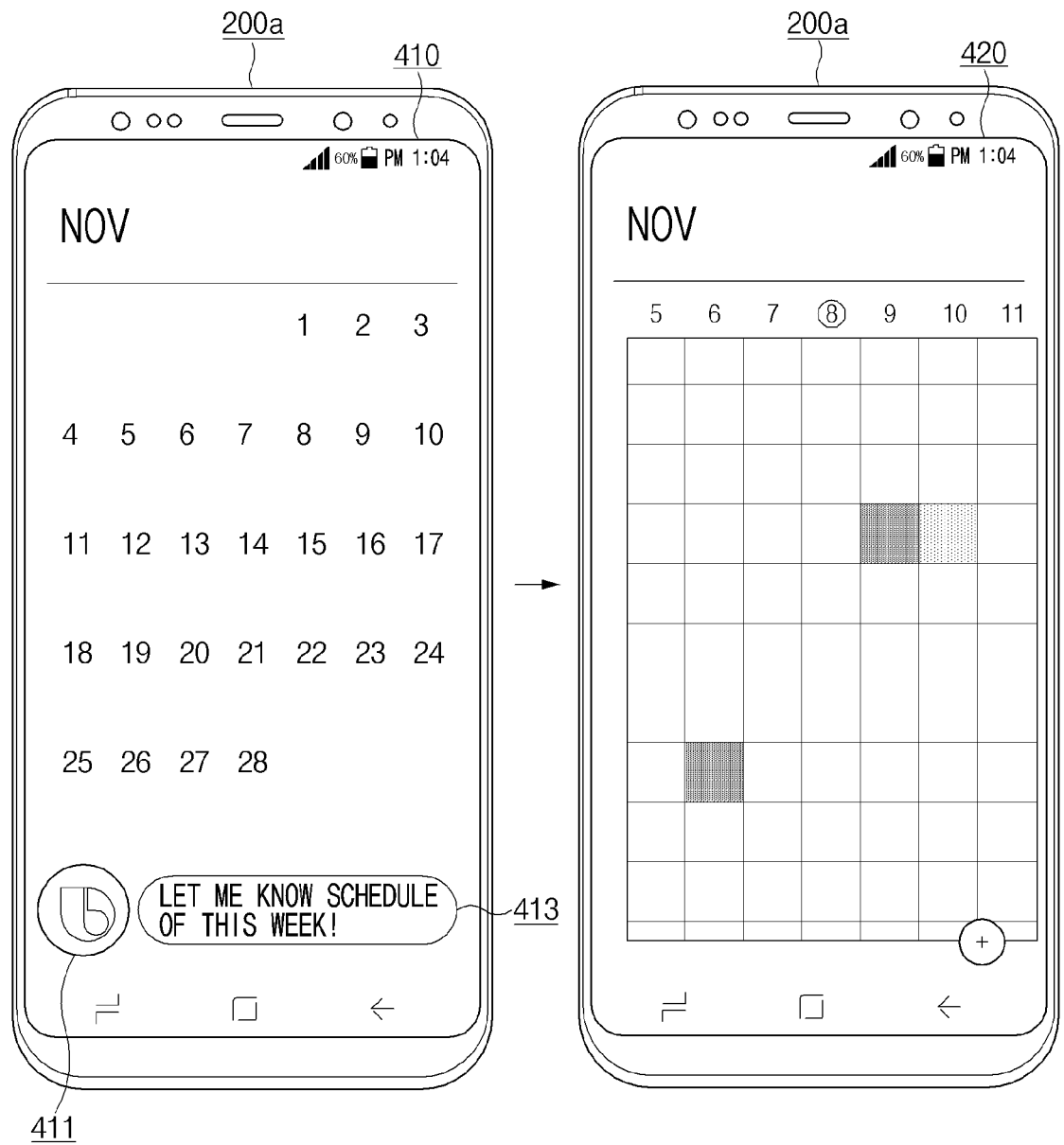
FIG. 4 is a view illustrating a screen in which a user terminal processes a voice input received through an intelligence app, according to various embodiments.

FIG. 4 is a view illustrating a screen in which a user terminal processes a voice input received through an intelligence app, according to various embodiments.

The user terminal 200a may execute an intelligence app to process a user input through the intelligence server 200b.

According to an embodiment, on screen 410, when recognizing a specified voice input (e.g., wake up!) or receiving an input via a hardware key (e.g., a dedicated hardware key), the user terminal 200a may launch an intelligence app for processing a voice input. For example, the user terminal 200a may launch the intelligence app in a state where a schedule app is executed. According to an embodiment, the user terminal 200a may display an object (e.g., an icon) 411 corresponding to the intelligence app, on the display. According to an embodiment, the user terminal 200a may receive a voice input by a user utterance. For example, the user terminal 200a may receive a voice input saying that "Let me know the schedule of this week!". According to an embodiment, the user terminal 200a may display a user interface (UI) 413 (e.g., an input window) of the intelligence app, in which text data of the received voice input is displayed, on a display.

According to an embodiment, on screen 420, the user terminal 200a may display a result corresponding to the received voice input, on the display. For example, the user terminal 200a may receive a plan corresponding to the received user input and may display 'the schedule of this week' on the display depending on the plan.

Figure 5:
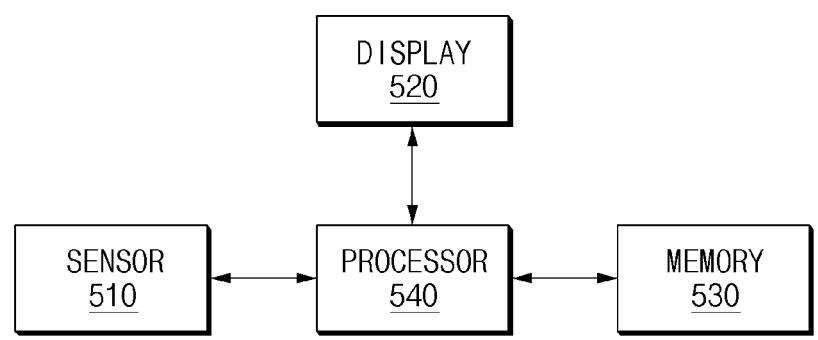
FIG. 5 illustrates a block diagram of an electronic device, according to various embodiments.

FIG. 5 illustrates a block diagram of an electronic device, according to various embodiments.

Referring to FIG. 5, an electronic device 500 (e.g., the electronic device 101 of FIG. 1 or the user terminal 200a of FIG. 2) may include at least one sensor 510 (e.g., the sensor module 176 of FIG. 1), a display 520 (e.g., the display module 160 of FIG. 1 or the display 204 of FIG. 2), a memory 530 (e.g., the memory 130 of FIG. 1 or the memory 205 of FIG. 2), and a processor 540 (e.g., the processor 120 of FIG. 1 or the processor 206 of FIG. 2).

According to an embodiment, the at least one sensor 510 may detect a state or an external situation of the electronic device 500. For example, the at least one sensor 510 may include at least one of a location sensor, a gyro sensor, a magnetic sensor, an acceleration sensor, a temperature sensor, a humidity sensor, an illuminance sensor, or a noise sensor that detects a level of external noise. According to an embodiment, the at least one sensor 510 may provide the processor 540 with information associated with the detected state of the electronic device 500 or information associated with the detected external situation. The processor 540 may recognize (or determine) the context of the electronic device 500 or a user's context, based on information received through the at least one sensor 510.

According to an embodiment, the display 520 may display information associated with an operation of the electronic device 500. For example, the display 520 may display an application executed by the electronic device 500. For example, when the electronic device 500 executes a plurality of applications, the display 520 may display pieces of execution content of applications in different layers, respectively. For example, the display 520 may display the execution content or execution result of a first application in a first layer. The display 520 may display the execution content or execution result of a second application in a second layer.

According to an embodiment, under the control of the processor 540, the display 520 may display the second layer, on which the execution content or execution result of the second application is displayed, by overlaying the first layer with the second layer, when the second application is executed while the first application is being executed. For example, it may be understood that the overlaying of the first layer with the second layer means that the second layer covers up the first layer. According to an embodiment, under the control of the processor 540, the display 520 may adjust a transparency of the second layer such that content included in the first layer is displayed to the outside (e.g., a user) through the second layer while the first layer is overlaid with the second layer.

According to an embodiment, under the control of the processor 540, the display 520 may adjust a size of a text displayed on the display 520, a brightness of the display 520, whether to release each of a plurality of layers displayed on the display 520, or a time at which each of the plurality of layers are displayed.

According to an embodiment, the memory 530 may store at least one program, an application, data, or instructions executed by the processor 540. According to an embodiment, the memory 530 may include at least part of the memory 130 shown in FIG. 1 or at least part of the memory 205 shown in FIG. 2. According to an embodiment, the memory 530 may include information or instructions that allow at least part of operations of the electronic device 300, which will be described later, to be performed. According to an embodiment, the memory 530 may include instructions associated with a plurality of applications executed by the processor 540. For example, the memory 530 may include instructions corresponding to a voice assistant application that obtains a user's utterance and performs a task corresponding to content of the user's utterance.

According to an embodiment, the processor 540 may recognize the context of the electronic device 500 based on at least one of a state or external environment information of the electronic device 500 that is detected using the at least one sensor 510, the user's personal information, or a connection state with an external electronic device (not shown). For example, the context of the electronic device 500 may correspond to an environment or situation of the electronic device 500. For example, the context of the electronic device 500 may correspond to the environment or situation of the user who employs the electronic device 500. According to an embodiment, the processor 540 may recognize the context of the electronic device 500 by detecting whether the electronic device 500 is connected to the external electronic device (not illustrated) by wire and/or wirelessly.

According to an embodiment, the processor 540 may control an interface or execution environment of the voice assistant application executed by the electronic device 500, based on the recognized context. According to an embodiment, the processor 540 may control a setting value of the electronic device 500 based on the recognized context.

According to an embodiment, the processor 540 may execute the voice assistant application that performs a task according to the obtained utterance of the user, based on the recognized context.

According to various embodiments, the processor 540 may recognize that the context of the electronic device 500 corresponds to a driving mode. For example, the driving mode may correspond to a state where a user of the electronic device 500 is driving a vehicle. According to an embodiment, when a moving speed of the electronic device 500 detected using the at least one sensor 510 exceeds a reference speed, the processor 540 may recognize that the context of the electronic device 500 corresponds to the driving mode. For example, when detecting that the electronic device 500 is connected to an external electronic device (not illustrated) (e.g., an electronic device of a vehicle) in a wired and/or wirelessly, the processor 540 may recognize that the context of the electronic device 500 corresponds to the driving mode. For example, when a driving-related application (e.g., a navigation application) is executed, the processor 540 may recognize that the context of the electronic device 500 corresponds to the driving mode.

According to an embodiment, the processor 540 may control a plurality of layers displayed on the display 520 based on the fact that the recognized context corresponds to the driving mode. For example, the processor 540 may execute the navigation application and may display a navigation screen in the first layer of the display 520. While the navigation application is running, the processor 540 may execute the voice assistant application based on the user's command. The processor 540 may display the second layer including a screen, on which the voice assistant application is executed, on the display 520. According to an embodiment, the processor 540 may overlay the first layer with the second layer and then may display the overlaid result on the display 520. According to an embodiment, in the driving mode, the processor 540 may allow content of the first layer to be displayed on the display 520 through the second layer by adjusting a transparency of the second layer. Even while the voice assistant application is executed, the user may recognize content provided by the navigation application. According to an embodiment, the processor 540 may obtain a user utterance from the user and then may perform a task corresponding to the user utterance. For example, the processor 540 may release (or remove) the second layer from the display 520 and may display a third layer including the result of performing a task on the display 520. For example, the processor 540 may overlay the first layer and/or the second layer with the third layer and then may display the overlaid result on the display 520. For example, the third layer may be opaquely displayed on the display 520. According to an embodiment, the processor 540 may release (or remove) the third layer from the display 520 after a specified time has elapsed. For example, the processor 540 may display the result of performing a task on the display 520 during a specified time (e.g., 'N' seconds, 'N' is a positive number) and may allow the display 520 not to display the result of performing a task after a specified time has elapsed. The processor 540 may display a navigation screen included in the first layer on the display 520 without an additional input from a user by displaying the first layer on the display 520 after the specified time has elapsed.

According to an embodiment, the processor 540 may adjust sensitivity, at which the user's command for executing the voice assistant application is recognized, based on the recognized context. According to an embodiment, in the driving mode, the processor 540 may set a sensitivity adjustment value to recognize the user's command for executing the voice assistant application. For example, the processor 540 may set a reference value (e.g., an accuracy at which the user's command is recognized, or a level at which the user's command is recognized) for recognizing the user's command. When the user's command corresponding to the reference value is received, the processor 540 may execute the voice assistant application. According to an embodiment, in the driving mode, the processor 540 may adjust the reference value for recognizing the user's command for executing the voice assistant application. In the driving mode, the processor 540 may execute the voice assistant application relatively sensitively in response to the user's command based on the adjusted reference value.

According to an embodiment, in the driving mode, the processor 540 may adjust an operating time of the voice assistant application. For example, the processor 540 may execute the voice assistant application based on the user's command for executing the voice assistant application. While the voice assistant application is executed, the processor 540 may wait for receiving a user utterance from the user during a first time, and then may receive a user utterance from the user during a second time after the first time. According to an embodiment, in the driving mode, the gaze and/or attention of a user of the electronic device 500 may be frequently moved to another point (e.g., an environment outside a vehicle or a display area of another application) other than a display area of the voice assistant application. According to an embodiment, in the driving mode, the processor 540 may control the execution environment of the voice assistant application so as to wait for receiving a user utterance for a relatively-long time. For example, in the driving mode, the processor 540 may control a first wait time for a user utterance to have a value greater than a predetermined waiting time. For example, the processor 540 may control an input waiting time (e.g., the first wait time) of a microphone (not illustrated) included in the electronic device 500 so as to have a value greater than the predetermined waiting time.

According to an embodiment, in the driving mode, when the voice assistant application is executed, the processor 540 may control a setting value of the electronic device 500.

According to an embodiment, in the driving mode, the processor 540 may set a size of a text displayed on the display 520 so as to be greater than a predetermined text size. For example, the processor 540 may display a result of performing a task in the voice assistant application, on the display 520 in a text format. According to an embodiment, in the driving mode, the processor 540 may allow a user to easily recognize the result of performing a task in the voice assistant application, by setting a size of a text displayed on the display 520 so as to be greater than a predetermined text size. According to an embodiment, in the driving mode, the processor 540 may improve the visibility of a text displayed on the display 520.

According to an embodiment, in the driving mode, the processor 540 may set a brightness of the display 520 so as to be greater than a predetermined brightness. For example, the processor 540 allows the user to easily recognize a result of performing a task in the voice assistant application, by setting the brightness of the display 520 to be greater than the predetermined brightness.

According to an embodiment, in the driving mode, the processor 540 may set a volume of a sound device (not illustrated) (e.g., a speaker) included in the electronic device 500 so as to be greater than a predetermined volume. For example, when the voice assistant application provides a result of performing a task to the user through a voice, the processor 540 may allow the user to easily recognize a result of performing a task by setting the volume of the sound device (not illustrated) so as to be greater than the predetermined volume.

According to an embodiment, the electronic device 500 may be in an environment where external noise is high. For example, the above-described driving mode may cope with the environment having high external noise. The processor 540 may allow the sound device (not illustrated) to have a volume greater than a predetermined volume, and thus may efficiently provide a user with voice information even in the environments having high external noise. For example, when recognizing a context having high noise, the processor 540 may provide a user with a response of the voice assistant application by setting the volume of the sound device (not illustrated) to be greater than the predetermined volume.

According to an embodiment, in the driving mode, the processor 540 may set an input method of the electronic device 500 as a hands-free method. For example, in the driving mode, the user may be in an environment that is difficult to provide the electronic device 500 with a touch input using the user's physical contact. For example, when the processor 540 receives an input from the user (e.g., entering data), the processor 540 may receive a voice input using a voice by activating a microphone (not illustrated).

According to various embodiments, the processor 540 may recognize that the context of the electronic device 500 corresponds to the driving ready mode. For example, the driving ready mode may correspond to a state before the user of the electronic device 500 starts driving a vehicle. For example, the processor 540 may recognize that the context of the electronic device 500 corresponds to the driving ready mode, by detecting that a distance between a location of the vehicle and a location of the electronic device 500 is within a reference distance, by using the at least one sensor 510. For example, the processor 540 may recognize that the context of the electronic device 500 corresponds to the driving ready mode, by recognizing that the electronic device 500 is connected to an external electronic device (not illustrated) (e.g., the communication device of the vehicle). For example, the electronic device 500 may be connected to the external electronic device (not illustrated) (e.g., a communication device of a vehicle) by wired and/or wirelessly. According to an embodiment, the processor 540 may execute a driving-related application (e.g., a navigation application) based on the fact that the processor 540 recognizes that the context of the electronic device 500 corresponds to the driving ready mode. According to an embodiment, the processor 540 may execute a driving-related capsule based on recognizing that the context of the electronic device 500 corresponds to the driving ready mode. For example, the processor 540 may execute a capsule that provides a user with information when a vehicle is driving. For example, the processor 540 may execute a capsule that provides 10th-day-no-driving-system notification information about vehicle driving or information associated with traffic regulations. According to an embodiment, the driving-related capsule may be provided by the electronic device 500 or the external electronic device (not illustrated) (e.g., a server).

According to various embodiments, the processor 540 may recognize a context associated with a location of the electronic device 500. For example, the processor 540 may recognize the location of the electronic device 500 by using the at least one sensor 510. According to an embodiment, the processor 540 may recognize that the electronic device 500 is located at the user's home, workplace, or school, based on the recognized location and the user's personal information (e.g., a location of the user's home, a location of the user's workplace, and/or a location of the user's school) stored in advance. For example, the processor 540 may recognize that the electronic device 500 is located at the user's home, workplace, or school, by using the user's personal information (e.g., a bedtime, a wake-up time, office hours, or school hours) about the user's life pattern. According to an embodiment, when the processor 540 recognizes that the context of the electronic device 500 corresponds to a workplace or a school, the processor 540 may adjust a reference value for recognizing the user's command for executing the voice assistant application.

For example, when the processor 540 recognizes that the context of the electronic device 500 corresponds to the user's workplace or school, the processor 540 may determine that the electronic device 500 is located in a relatively-high-noise environment. When the processor 540 recognizes a context corresponding to the high noise of the electronic device 500, the processor 540 may adjust the reference value (e.g., an accuracy at which the user's command is recognized, or a level at which the user's command is recognized) for recognizing the user's command. The processor 540 may execute the voice assistant application by recognizing the user's command at relatively-high sensitivity depending on the adjusted reference value. For example, the processor 540 may execute the voice assistant application relatively sensitively in response to the user's command based on the adjusted reference value.

For example, when the processor 540 recognizes that the context of the electronic device 500 corresponds to the user's home, the processor 540 may determine that the electronic device 500 is located in a relatively-low-noise environment. When the processor 540 recognizes a context corresponding to the low noise of the electronic device 500, the processor 540 may adjust the reference value (e.g., the accuracy at which the user's command is recognized, or a level at which the user's command is recognized) for recognizing the user's command for executing the voice assistant application. For example, the processor 540 may execute the voice assistant application by recognizing the user's command at relatively-low sensitivity depending on the adjusted reference value. The processor 540 may execute the voice assistant application less sensitively in response to the user's command based on the adjusted reference value. According to an embodiment, when the processor 540 recognizes that the context of the electronic device 500 corresponds to the user's home, the processor 540 may automatically unlock a lock mode of the electronic device 500.

According to an embodiment, the processor 540 may recognize a context corresponding to the user's bedtime or wake-up time, by using the at least one sensor 510 and the user's personal information about the user's life pattern. According to an embodiment, when the electronic device 500 is located at home and a current time is the user's bedtime, the processor 540 may recognize that the context of the electronic device 500 corresponds to the user's bedtime. For example, the processor 540 may control a setting value of the electronic device 500, based on a context corresponding to the recognized bedtime. For example, in a context corresponding to the bedtime, the processor 540 may set a volume of a sound device (not illustrated) (e.g., a speaker) included in the electronic device 500 to be smaller than a predetermined volume and may set a brightness of the display 520 to be smaller than a predetermined brightness. According to an embodiment, in a context corresponding to the bedtime, the processor 540 may provide schedule information to the user by executing a capsule associated with the user's schedule. For example, the processor 540 may output information associated with the user's tomorrow schedule among the user's personal information to the outside by using a speaker (not illustrated) or may display the information on the display 520. According to an embodiment, when the electronic device 500 is located at home and the current time is the user's wake-up time, the processor 540 may recognize that the context of the electronic device 500 corresponds to the user's wake-up time. The processor 540 may control a setting value of the electronic device 500, based on the context corresponding to the recognized wake-up time. For example, in a context corresponding to the wake-up time, the processor 540 may set the volume of the sound device (not illustrated) (e.g., a speaker) included in the electronic device 500 not to be lower than the predetermined volume and may set the brightness of the display 520 not to be lower than the predetermined brightness. For example, in a context corresponding to the wake-up time, the processor 540 may restore the setting value of the electronic device 500, which is changed based on the context corresponding to the bedtime, to an original value.

According to various embodiments, the processor 540 may recognize the context of the electronic device 500 based on the at least one sensor 510 and/or the type of a running application. For example, when the electronic device 500 is executing a music playback application, the processor 540 may recognize that the context of the electronic device 500 corresponds to a relatively-high-noise situation (or state). For example, when the electronic device 500 is executing an exercise application, the processor 540 may recognize that the context of the electronic device 500 corresponds to a relatively-high-noise situation (or state). In this case, the processor 540 may adjust a reference value (e.g., the accuracy at which the user's command is recognized, or a level at which the user's command is recognized) for recognizing the user's command so as to be able to execute the voice assistant application sensitively in response to the user's command. The processor 540 may recognize the user's command at relatively-high sensitivity based on the adjusted reference value, and then may execute the voice assistant application in response to the recognized command of the user. For example, when the electronic device 500 is executing a cooking application, the processor 540 may recognize that the user's context corresponds to a situation (or a state) of "cooking food". Similarly to the driving mode described above, when the user's context is "cooking food", the processor 540 may control a first wait time for a user utterance of the voice assistant application to have a value greater than the predetermined waiting time. When the user's context is "cooking food", the processor 540 may set a size of a text displayed on the display 520 so as to be greater than the predetermined text size. When the user's context is "cooking food", the processor 540 may set a brightness of the display 520 so as to be greater than the predetermined brightness. When the user's context is "cooking food", the processor 540 may set a volume of the sound device (not illustrated) (e.g., a speaker) included in the electronic device 500 so as to be greater than the predetermined volume. According to an embodiment, when the user's context is "cooking food", the voice assistant application may perform a task based on the user's utterance, and the processor 540 may display a screen indicating the result of performing the task on the display 520 for a time longer than the specified display time. For example, when the user's context is "cooking food", the processor 540 may receive a user utterance for requesting a recipe and thereafter perform the task of providing a recipe to the user by using the voice assistant application. According to an embodiment, the processor 540 may allow the user to easily refer to content (e.g., a recipe) by displaying content corresponding to the result of performing a task on the display 520 for a relatively-long time.

According to various embodiments, the processor 540 may measure a level of external noise of the electronic device 500 by using the at least one sensor 510. The processor 540 may control sensitivity, at which the user's command for executing a voice assistant application is recognized, based on the measured level of the external noise. According to an embodiment, the processor 540 may recognize that the context of the electronic device 500 corresponds to a high-noise environment, based on the measured level of the external noise. In the context corresponding to the high-noise environment, the processor 540 may adjust a reference value for recognizing the user's command and then may execute the voice assistant application at high sensitivity. For example, in the context corresponding to a high-noise environment, the processor 540 may sensitively recognize the user's command based on the adjusted reference value, and then may execute the voice assistant application in response to the recognized command of the user. According to an embodiment, the processor 540 may recognize that a context of the electronic device 500 corresponds to a low-noise environment, based on the measured level of the external noise. In the context corresponding to a low-noise environment, the processor 540 may adjust the reference value for recognizing the user's command and then may perform the voice assistant application at low sensitivity. For example, in the context corresponding to a low-noise environment, the processor 540 may recognize the user's command less sensitively based on the adjusted reference value and then may execute the voice assistant application in response to the recognized command of the user.

According to various embodiments, the electronic device 500 may recognize an internal and/or external context of the electronic device 500, or may recognize various contexts associated with the user, and then may control an interface of the voice assistant application and/or a setting value of the electronic device 500 so as to match the recognized context. According to an embodiment, the electronic device 500 may provide the user with improved convenience by controlling an operation of the electronic device 500, based on an internal and/or external environment or based on the user's environment.

Figure 6A:
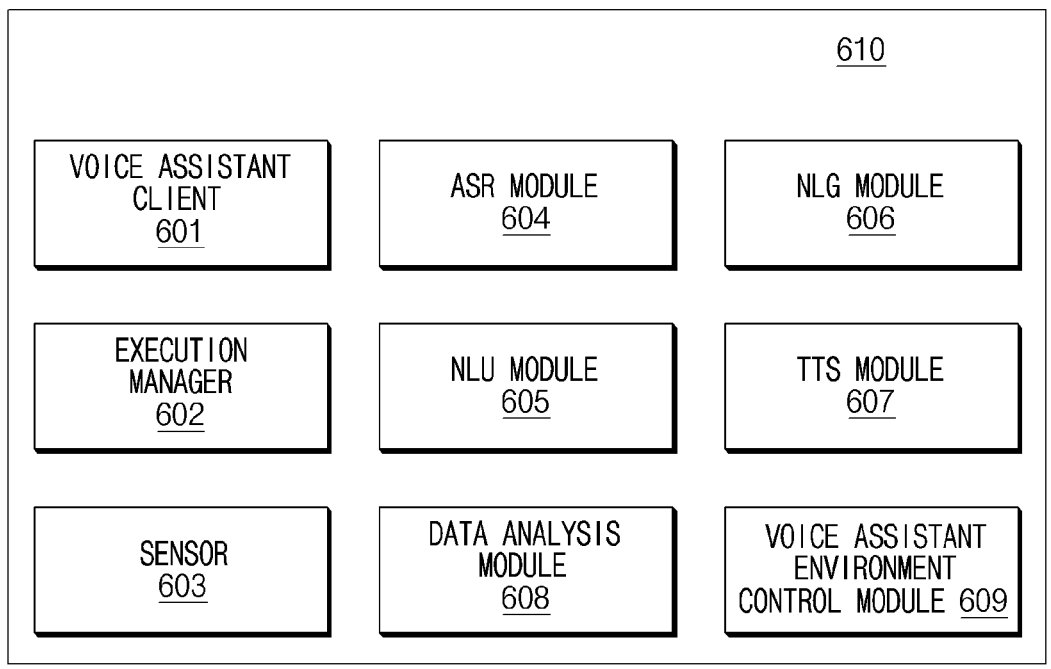
FIG. 6A illustrates a block diagram of an electronic device, according to various embodiments.

FIG. 6A illustrates a block diagram of an electronic device, according to various embodiments.

Referring to FIG. 6A, an electronic device 610 (e.g., the electronic device 101 of FIG. 1, the user terminal 200a of FIG. 2, or the electronic device 500 of FIG. 5) may include a voice assistant client 601, an execution manager 602, a sensor 603 (e.g., the sensor module 176 of FIG. 1 or the at least one sensor 510 of FIG. 5), an ASR module 604 (e.g., the ASR module 221 of FIG. 2), an NLU module 605 (e.g., the NLU module 223 of FIG. 2), a data analysis module 608, an NLG module 606 (e.g., the NLG module 227 of FIG. 2), a TTS module 607 (e.g., the TTS module 229 of FIG. 2), and a voice assistant environment control module 609.

For example, configurations of the electronic device 610 illustrated in FIG. 6A may be software modules including one or more instructions stored in a memory (e.g., the memory 130 of FIG. 1, the memory 205 of FIG. 2, or the memory 530 of FIG. 5) of the electronic device 610. For example, the software modules may be executed by a processor (e.g., the processor 120 of FIG. 1, the processor 206 of FIG. 2, or the processor 540 of FIG. 5). According to an embodiment, at least one of the configurations may be implemented using a physical hardware module, logic, a logic block, or a circuit; and the processor (e.g., the processor 120 of FIG. 1, the processor 206 of FIG. 2, or the processor 540 of FIG. 5) may include at least one of the configurations. According to various embodiments, at least part of the configurations illustrated in FIG. 6A may be omitted, or two or more configurations may operate integrally. According to various embodiments, the number of processors included in the electronic device 610 is not limited to that shown in FIG. 6. For example, the configurations shown in FIG. 6A may be implemented using two or more processors (not illustrated). In addition, the configurations shown in FIG. 6A are illustrated for convenience of description, and thus are not interpreted as being limited to the above-described embodiments.

According to an embodiment, the voice assistant client 601 may receive a user's command for executing a voice assistant application and the user's utterance for requesting the execution of a task. The user's command and the user's utterance that are received may be provided to the ASR module 604.

According to an embodiment, the execution manager 602 may control hardware configurations and/or software configurations of the electronic device 610 to perform a task intended by the user's utterance.

According to an embodiment, the sensor 603 may detect the electronic device 610 or a state or external situation of the electronic device 610 and then may obtain information for recognizing a context of the electronic device 610 or the user's context. For example, the sensor 603 may include at least one of a location sensor, a gyro sensor, a magnetic sensor, an acceleration sensor, a temperature sensor, a humidity sensor, an illuminance sensor, or a noise sensor that detects a level of external noise. According to an embodiment, the sensor 603 may provide the obtained information to the data analysis module 608. Because the sensor 603 shown in FIG. 6A is only an example, the number of the sensors 603 is not interpreted to be limited to that shown in FIG. 6A.

According to an embodiment, the ASR module 604 may convert the user's utterance composed of voice data into text data. The converted text data may be provided to the NLU module 605.

According to an embodiment, the NLU module 605 may receive the text data corresponding to the user's utterance and may analyze the user's utterance. For example, the NLU module 605 may extract a corresponding domain, the user's intent, and/or a parameter by analyzing the user's utterance. For example, the NLU module 605 may grasp the domain and/or the user's intent by performing syntactic analysis or semantic analysis. For example, the NLU module 605 may grasp the meaning of words extracted from the voice input by using linguistic features (e.g., syntactic elements) such as morphemes or phrases and may determine the user's intent by matching the grasped meaning of the words to the intent.

According to an embodiment, the data analysis module 608 may analyze and/or recognize a context of the electronic device 610 or the user's context by using information obtained through the sensor 603 As described above with reference to FIG. 5, the data analysis module 608 may recognize the context (e.g., at least one of a driving mode, a driving ready mode, the user's home, the user's workplace, the user's school, the user's bedtime, the user's wake-up time, a level of external noise, a state in which the user is cooking, and/or a state in which the user is exercising) of the electronic device 610, based on the sensor 603 and/or a connection state with an external electronic device (not illustrated). According to an embodiment, the data analysis module 608 may provide the voice assistant environment control module 609 with information about the recognized context of the electronic device 610.

According to an embodiment, the NLG module 606 may generate a response with which the voice assistant application provides the user. For example, when a task corresponding to the user's utterance includes providing a response to the user, the electronic device 610 may generate a response by using the NLG module 606. For example, the response generated by the NLG module 606 may be composed of text data.

According to an embodiment, the TTS module 607 may convert the response generated using the NLG module 606 into voice data.

According to an embodiment, the voice assistant environment control module 609 may control an interface or execution environment of the voice assistant application based on the context recognized by the data analysis module 608. According to an embodiment, the voice assistant environment control module 609 may control setting values (e.g., a size of a text displayed on a display, a brightness of the display, a volume of a sound device, and/or an activation of a microphone) of devices included in the electronic device 610 based on the context recognized by the data analysis module 608. The detailed description of recognizing the context of the electronic device 610 and controlling an interface, an execution environment, and/or a setting value of the voice assistant application based on the recognized context is described above with reference to FIG. 5, and thus an additional description will be omitted to avoid redundancy.

Figure 6B:
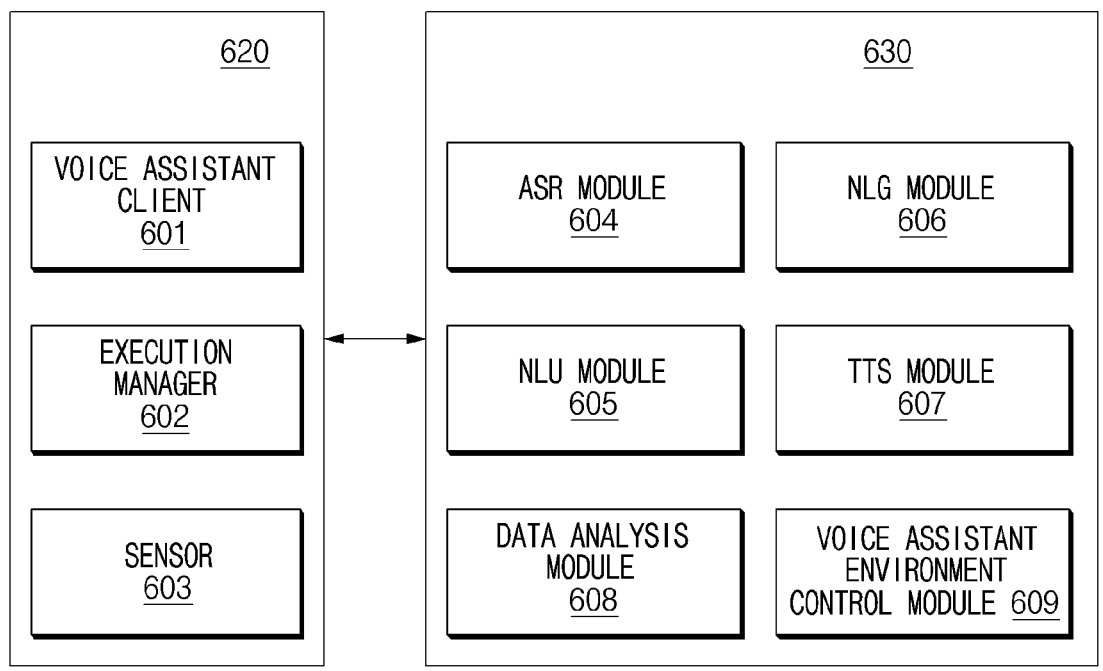
FIG. 6B illustrates a block diagram of an electronic device and an external electronic device, according to various embodiments.

FIG. 6B illustrates a block diagram of an electronic device and an external electronic device, according to various embodiments.

According to an embodiment, at least part of configurations shown in FIG. 6B may be performed by an electronic device 620 (e.g., the electronic device 101 of FIG. 1, the user terminal 200a of FIG. 2, the electronic device 500 of FIG. 5, or the electronic device 610 of FIG. 6A). The rest other than the configurations performed by the electronic device 620 may be performed by an external electronic device 630 (e.g., a server). FIG. 6B illustrates configurations performed by the electronic device 620 and the external electronic device 630. Accordingly, in various embodiments, the configurations performed by the electronic device 620 and the external electronic device 630 may be different from those shown in FIG. 6B. According to various embodiments, at least part of configurations illustrated in FIG. 6B may be omitted, or two or more configurations may operate integrally. The configurations shown in FIG. 6B are the same as or substantially the same as the configurations shown in FIG. 6A, and thus, an additional description will be omitted to avoid redundancy.

Figure 7:
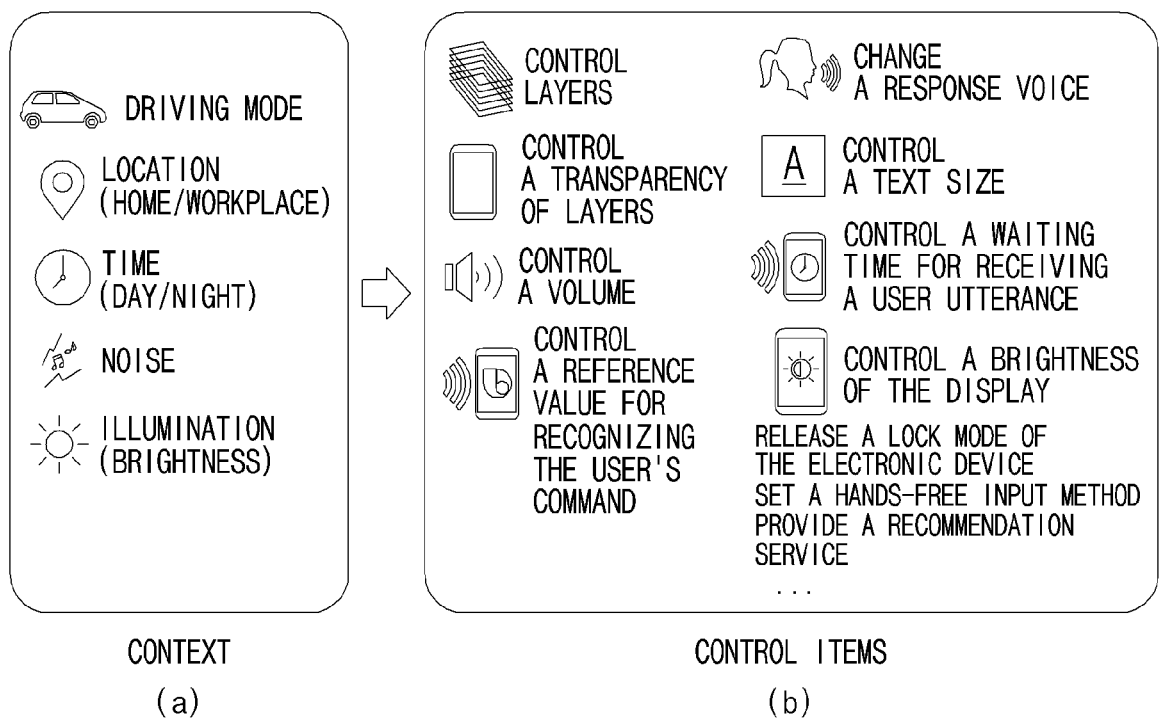
FIG. 7 is a diagram illustrating a context of an electronic device and control items of the electronic device, according to various embodiments.

FIG. 7 is a diagram illustrating a context of an electronic device and control items of the electronic device, according to various embodiments.

According to an embodiment, an electronic device 700 (e.g., the electronic device 101 of FIG. 1, the user terminal 200a of FIG. 2, the electronic device 500 of FIG. 5, the electronic device 610 of FIG. 6A, or the electronic device 620 of FIG. 6B) may recognize a context of the electronic device 700 or a user's context. For example, the context may include at least one of a mode (e.g., a driving mode or a driving ready mode) of an electronic device, a location (e.g., the user's home, the user's workplace, or the user's school) of the electronic device, a time (e.g., a bedtime or a wake-up time), a level of external noise, and a state (e.g., a state in which the user is cooking and/or a state in which the user is exercising) of the electronic device.

According to an embodiment, the electronic device 700 may control an interface of a voice assistant application and/or a setting value of the electronic device 700 based on the recognized context. According to an embodiment, the electronic device 700 may adjust transparency and/or whether to release (or remove) at least one of a plurality of layers displayed on a display, based on the recognized context. According to an embodiment, the electronic device 700 may adjust a volume of a sound device based on the recognized context. According to an embodiment, the electronic device 700 may adjust a reference value for recognizing the user's command for executing the voice assistant application based on the recognized context. For example, the electronic device 700 may control sensitivity, at which the user's command is recognized. According to an embodiment, the electronic device 700 may change a response voice of the voice assistant application, which is output to the outside, by adjusting a volume of the sound device (e.g., a speaker). According to an embodiment, the electronic device 700 may adjust a text size displayed on a display based on the recognized context. According to an embodiment, on the basis of the recognized context, the electronic device 700 may adjust a waiting time for receiving a user utterance, by adjusting an operating time of the voice assistant application. According to an embodiment, the electronic device 700 may adjust a brightness of the display based on the recognized context. According to an embodiment, on the basis of the recognized context, the electronic device 700 may automatically release a lock mode of the electronic device 700 or may set an input method of the electronic device 700 as a hands-free method. According to an embodiment, the electronic device 700 may provide a recommendation service based on the recognized context.

Figure 8:
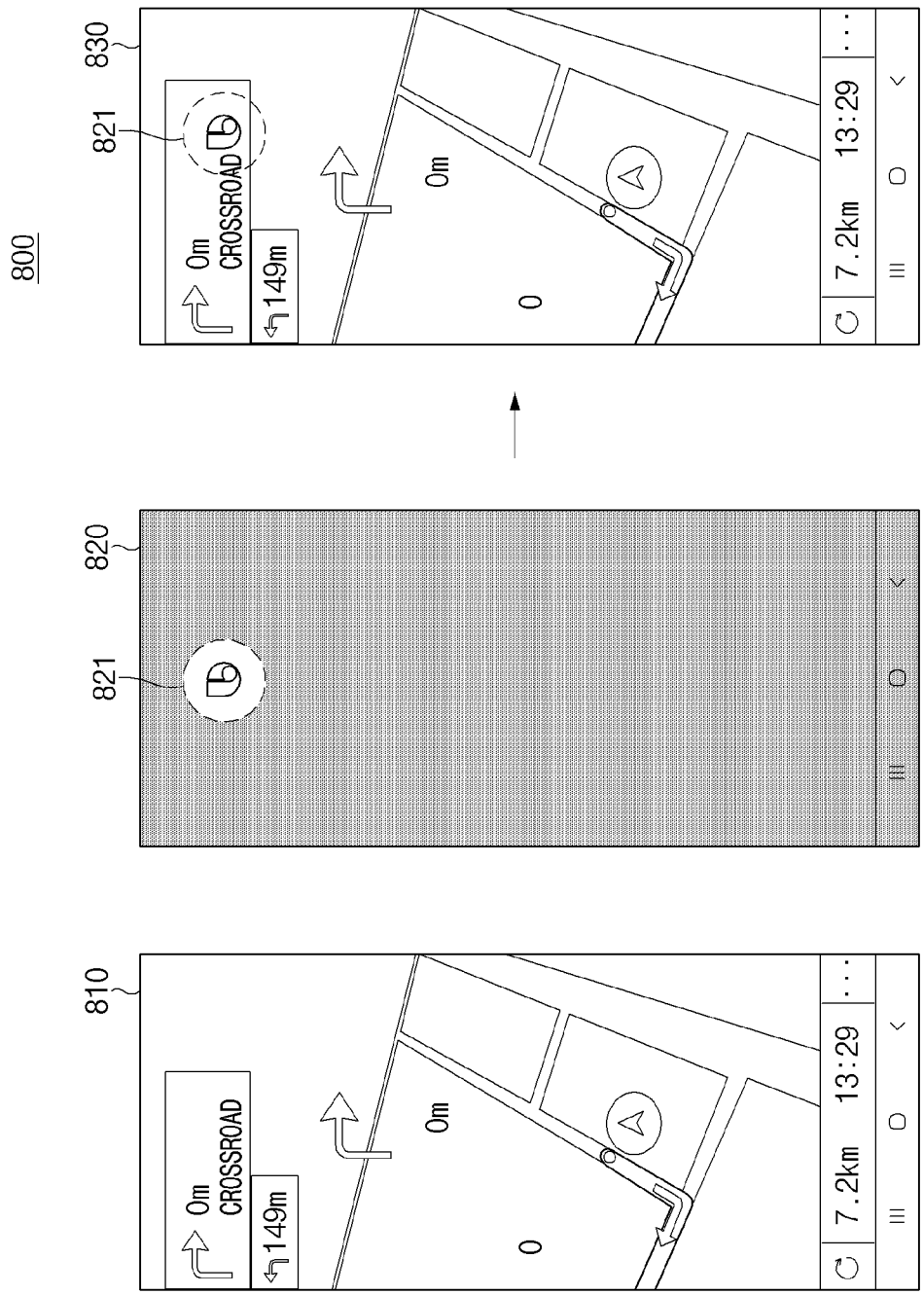
FIG. 8 is a diagram illustrating that an electronic device controls a plurality of layers displayed on a display, according to various embodiments.

FIG. 8 is a diagram illustrating that an electronic device controls a plurality of layers displayed on a display, according to various embodiments.

Referring to FIG. 8, when a context of an electronic device 800 (e.g., the electronic device 101 of FIG. 1, the user terminal 200a of FIG. 2, the electronic device 500 of FIG. 5, the electronic device 610 of FIG. 6A, the electronic device 620 of FIG. 6B, or the electronic device 700 of FIG. 7) according to an embodiment corresponds to a driving mode, screens displayed on a display are shown upon executing two or more applications.

According to an embodiment, upon executing a first application, the electronic device 800 may display a first screen 810 including content associated with a first application in a first layer of the display. For example, the first application may include a driving-related application (e.g., a navigation application).

According to an embodiment, upon executing the voice assistant application in response to a user's command, the electronic device 800 may display a second screen 820 including content of the voice assistant application in a second layer of the display. For example, the electronic device 800 may further include, in the second layer, a first UI 821 indicating whether to execute the voice assistant application.

According to an embodiment, the electronic device 800 may display a third screen 830, on which the first layer is overlaid with the second layer, on the display. The electronic device 800 according to an embodiment may improve user convenience based on a context. For example, the electronic device 800 may control a transparency of the second layer such that the user is capable of recognizing content of the first application displayed in the first layer while the voice assistant application is executed. For example, in a driving mode, when executing the voice assistant application, the electronic device 800 may allow the user to continuously recognize the content associated with the first application displayed in the first layer, by adjusting the transparency of the second layer. For example, in the driving mode, the electronic device 800 may display content included in the first layer on the display through the second layer, by setting the transparency of the second layer to be high.

Figure 9:
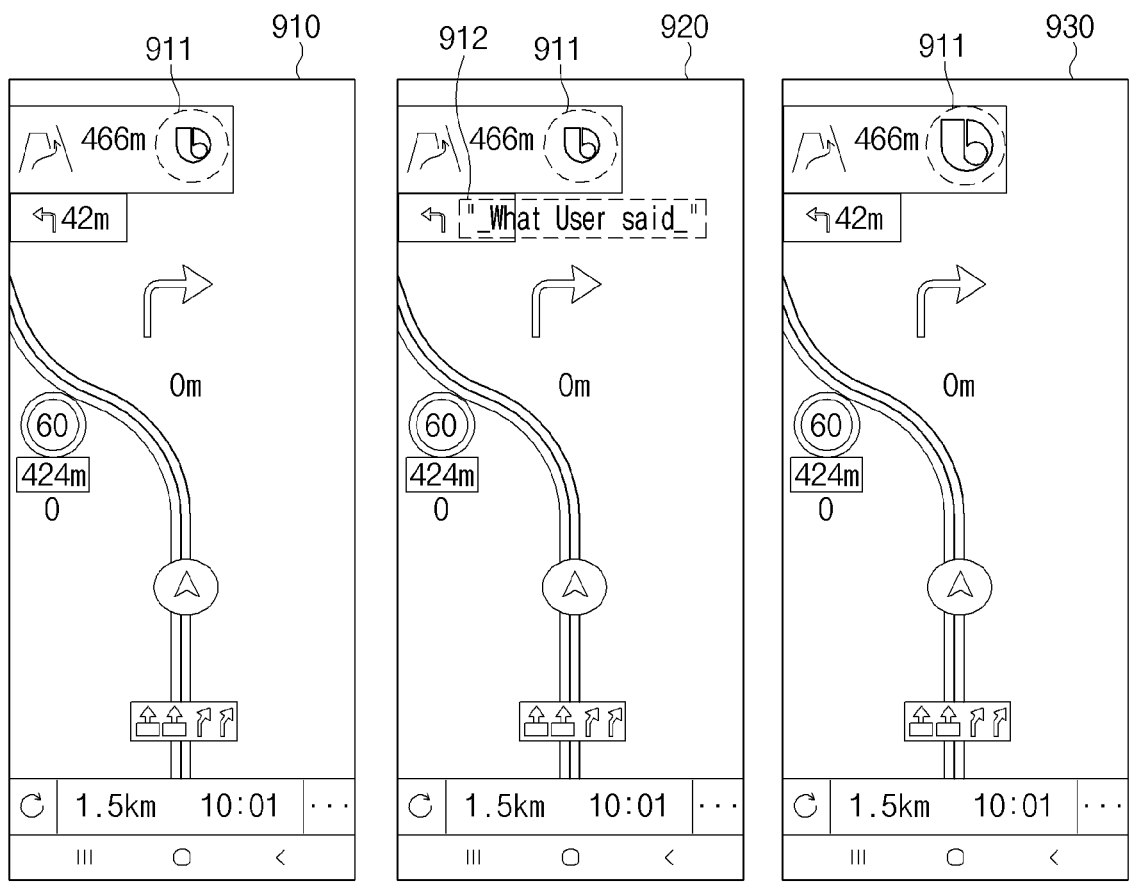
FIG. 9 is a diagram illustrating that an electronic device executes a voice recognition application while a plurality of layers are overlaid, according to various embodiments.

FIG. 9 is a diagram illustrating that an electronic device executes a voice recognition application while a plurality of layers are overlaid, according to various embodiments.

Referring to FIG. 9, when a context of an electronic device 900 (e.g., the electronic device 101 of FIG. 1, the user terminal 200a of FIG. 2, the electronic device 500 of FIG. 5, the electronic device 610 of FIG. 6A, the electronic device 620 of FIG. 6B, the electronic device 700 of FIG. 7, or the electronic device 800 of FIG. 8) according to an embodiment corresponds to a driving mode, screens displayed on a display are shown while a plurality of layers are overlaid.

According to an embodiment, the electronic device 900 may display a first screen 910, on which the first layer is overlaid with the second layer, on the display. According to an embodiment, when a context corresponds to the driving mode, the electronic device 900 may allow content included in the first layer to be displayed to the outside through the second layer, by adjusting a transparency of the second layer. According to an embodiment, the first layer may include content associated with a first application. For example, the first application may include a driving-related application (e.g., a navigation application). According to an embodiment, the second layer may include a first UI 911 indicating whether to execute the voice assistant application.

Referring to the first screen 910 of FIG. 9, while the electronic device 900 is waiting for receiving a user utterance from a user in a state where the voice assistant application is executed, the electronic device 900 may display the first UI 911 in the second layer. According to an embodiment, because the electronic device 900 adjusts a transparency of the second layer, the electronic device 900 may allow content included in the first layer to be exposed through the display while the first UI 911 is displayed in the second layer. For example, while the voice assistant application is executed, the electronic device 900 may allow a user to recognize content displayed by a driving-related application.

According to an embodiment, when the recognized context corresponds to the driving mode, the electronic device 900 may set a time for displaying the first UI 911 to be relatively long. For example, after the electronic device 900 executes the voice assistant application, the electronic device 900 may control a first wait time for receiving a user utterance from a user to have a value greater than a predetermined waiting time. The electronic device 900 may display the first UI 911 in the second layer during the first wait time. In the driving mode where the user's gaze and/or attention is frequently moved, the electronic device 900 may wait for receiving a user utterance for a time longer than the predetermined waiting time.

According to an embodiment, while receiving a user utterance from the user in a state where the voice assistant application is executed, the electronic device 900 may display a second screen 920 on which the first layer is overlaid with the second layer, on the display. For example, the electronic device 900 may display a second UI 912 corresponding to a user utterance in the second layer during a second time during which a user utterance is received from the user. For example, the second UI 912 may include text data corresponding to the user's utterance. For example, the second UI 912 may include a result of converting a user's utterance input as voice data into text data in real time. According to an embodiment, the electronic device 900 may adjust a transparency of the second layer in the driving mode, and thus the electronic device 900 may allow content included in the first layer to be exposed through the display while the second UI 912 is displayed. For example, the electronic device 900 may allow the user to recognize content displayed by the driving-related application during the second time during which the second UI 912 is displayed.

According to an embodiment, while analyzing the user utterance received from the user in a state where the voice assistant application is executed, the electronic device 900 may display a third screen 930 on which the first layer is overlaid with the second layer, on the display. Referring to the third screen 930, while the electronic device 900 analyzes a user utterance, an appearance (e.g., a shape, a size, and/or a color) of the first UI 911 indicating whether the voice assistant application is running may be changed.

Figure 10:
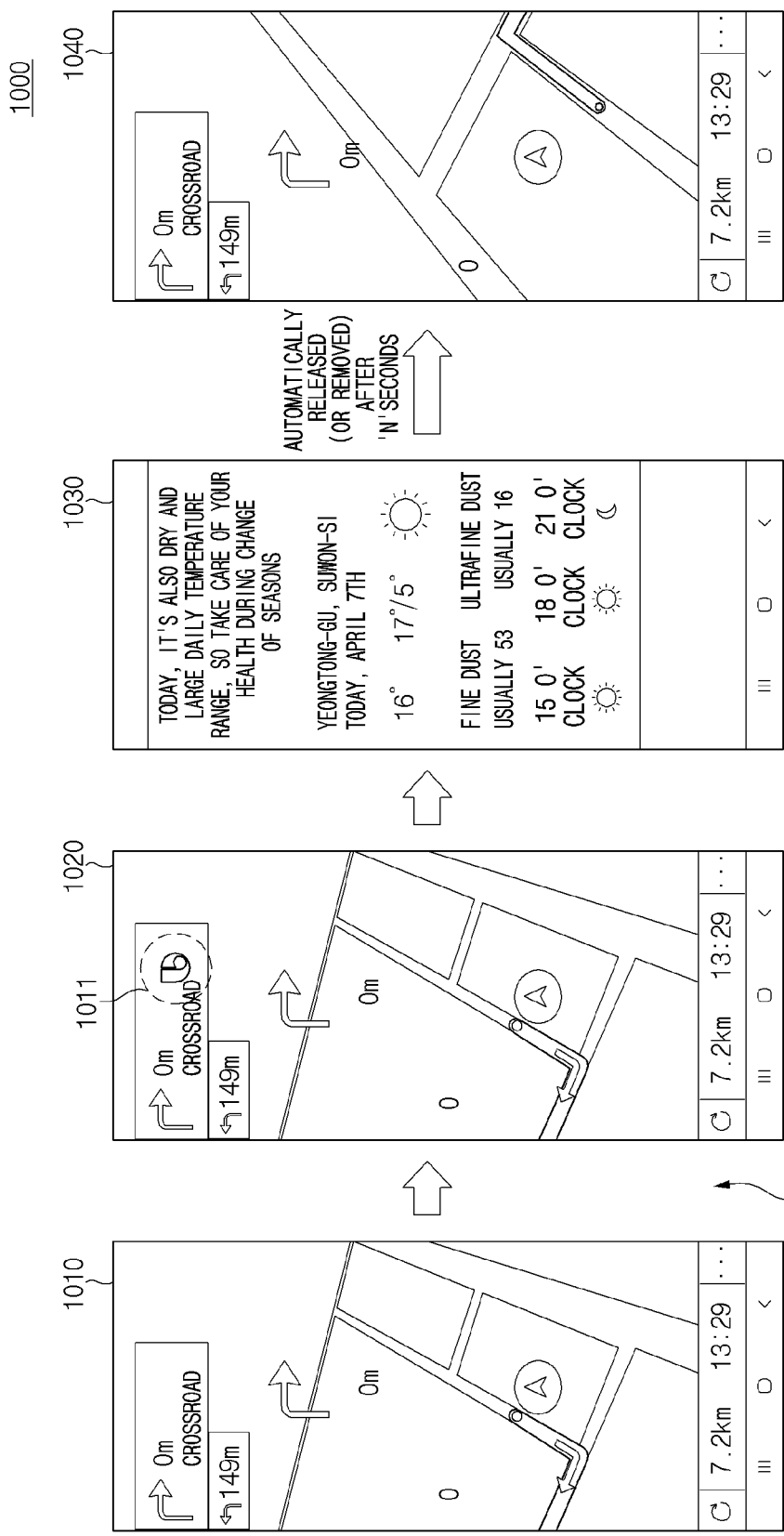
FIG. 10 is a diagram illustrating that an electronic device controls a plurality of layers, according to various embodiments.

FIG. 10 is a diagram illustrating that an electronic device controls a plurality of layers, according to various embodiments.

Referring to FIG. 10, when the context of an electronic device 1000 (e.g., the electronic device 101 of FIG. 1, the user terminal 200a of FIG. 2, the electronic device 500 of FIG. 5, the electronic device 610 of FIG. 6A, the electronic device 620 of FIG. 6B, the electronic device 700 of FIG. 7, the electronic device 800 of FIG. 8, or the electronic device 900 of FIG. 9) according to an embodiment corresponds to a driving mode, screens, on each of which the electronic device 1000 performs a task requested by a user by using a voice assistant application, are shown.

According to an embodiment, the electronic device 1000 may display a first screen 1010, on which a first layer including content associated with a first application is displayed, on a display by executing a first application. For example, the first application may include a driving-related application (e.g., a navigation application). The electronic device 1000 may execute the voice assistant application by receiving a user's command for executing the voice assistant application from the user. While executing the voice assistant application, the electronic device 1000 may receive a user utterance from the user. For example, the user utterance may include "let me know today's weather".

According to an embodiment, the electronic device 1000 may display a second screen 1020, on which the first layer including content associated with the first application is overlaid with a second layer including content of the voice assistant application, on the display. While the voice assistant application is executed, the electronic device 1000 may include a first UI 1011 in the second layer so as to be display.

According to an embodiment, the electronic device 1000 may analyze a user utterance, and then may release (or remove) the second layer from the display. The electronic device 1000 may display, on the display, a third screen 1030 including a third layer including a result of performing a task corresponding to the analyzed user utterance. For example, the third screen 1030 may be a screen displayed on the display while the first layer is overlaid with the third layer. For example, the third layer may be opaquely displayed on the display. According to an embodiment, the electronic device 1000 may display the third layer including a result of performing a task in the voice assistant application, on the display during a specified time (e.g., 'N' seconds, 'N' is a positive number) based on the fact that the recognized context corresponds to the driving mode.

According to an embodiment, the electronic device 1000 may release (or remove) the third layer from the display after a specified time based on the recognized context. The electronic device 1000 may display a fourth screen 1040, which includes a first layer after the third layer is released (or removed), on the display. For example, when the recognized context corresponds to the driving mode, the electronic device 1000 may display the third layer including a result for a task requested by the user during a specified time, and then may release (or remove) the third layer after a specified time. The electronic device 1000 may release (or remove) the third layer, and then may display content (e.g., a navigation screen) associated with the first application on the display. According to an embodiment, the electronic device 1000 may automatically release (or remove) the third layer after a specified time without receiving an additional user input, and then may display the first layer again on the display.

Figure 11:
FIG. 11 is a diagram illustrating that an electronic device controls a setting value, according to various embodiments.
Figure 11:
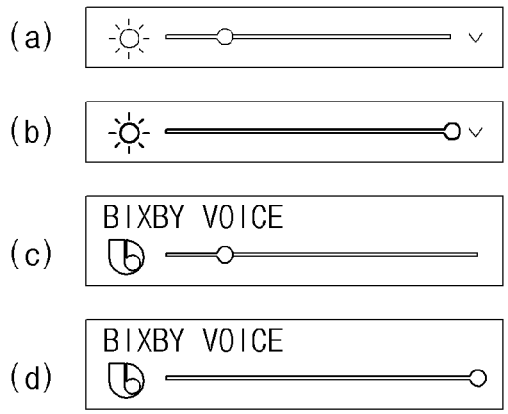

FIG. 11 is a diagram illustrating that an electronic device controls a setting value, according to various embodiments.

According to an embodiment, an electronic device 1100 (e.g., the electronic device 101 of FIG. 1, the user terminal 200a of FIG. 2, the electronic device 500 of FIG. 5, the electronic device 610 of FIG. 6A, the electronic device 620 of FIG. 6B, the electronic device 700 of FIG. 7, the electronic device 800 of FIG. 8, the electronic device 900 of FIG. 9, or the electronic device 1000 of FIG. 10) may recognize a context and may control a setting value of the electronic device 1100 based on the recognized context.

According to an embodiment, the electronic device 1100 may control sensitivity, at which a user's command for executing a voice assistant application is recognized, (or may adjust a reference value for recognizing the user's command) depending on a level of ambient noise.

For example, in a high-noise context, the electronic device 1100 may relatively sensitively recognize a user command, by setting the sensitivity, at which the user's command is recognized, to be high. The electronic device 1100 may execute the voice assistant application in response to the recognized command of the user. For example, even though a command is received from a user, of which the pronunciation has relatively-low accuracy, or the user's command having a relatively-small volume is received, the electronic device 1100 may execute the voice assistant application.

For example, in a low-noise context, the electronic device 1100 may less sensitively recognize the user's command by setting the sensitivity, at which the user's command is recognized, to be low. The electronic device 1100 may execute the voice assistant application in response to the recognized command of the user. For example, when a command is received from a user, of which the pronunciation has a relatively high-accuracy, or the user's command having a relatively-great volume is received, the electronic device 1100 may execute the voice assistant application.

According to an embodiment, the electronic device 1100 may execute the voice assistant application and then may receive a user utterance (e.g., "let me know today's weather") from the user. The electronic device 1100 may perform a task corresponding to a user utterance and may provide the result to the user.

According to an embodiment, the electronic device 1100 may adjust a brightness of the display based on the recognized context. For example, when an ambient illumination of the electronic device 1100 is low, or a context recognized based on the user's personal information corresponds to the user's bedtime, the electronic device 1100 may lower the brightness of the display (a). For example, when the ambient illumination of the electronic device 1100 is high, the electronic device 1100 is executing another application (e.g., a navigation application, a music playback application, or a cooking application), or a context recognized based on the user's personal information corresponds to the user's wake-up time, the electronic device 1100 may increase the brightness of the display (b).

According to an embodiment, the electronic device 1100 may adjust a volume of a sound device (e.g., a speaker) based on the recognized context. The electronic device 1100 may output a response voice of the voice assistant application to the outside depending on the adjusted volume. For example, when the electronic device 1100 is in a low-noise environment, or a context recognized based on the user's personal information corresponds to the user's bedtime, the electronic device 1100 may lower the volume of the sound device (c). For example, when the electronic device 1100 is in a high-noise environment, the electronic device 1100 is executing another application (e.g., a navigation application, a music playback application, or a cooking application), or a context recognized based on the user's personal information corresponds to the user's wake-up time, the electronic device 1100 may increase the volume of the sound device (d).

Embodiments described with reference to the above drawings describe that the electronic device 1100 recognizes a context and changes an interface of the voice assistant application and/or a setting value of the electronic device 1100 based on the recognized context. In addition to the described embodiments, the electronic device 1100 may perform various operations based on the recognized context.

According to an embodiment of the disclosure, an electronic device (e.g., the electronic device 101 of FIG. 1, the user terminal 200a of FIG. 2, the electronic device 500 of FIG. 5, the electronic device 610 of FIG. 6A, the electronic device 620 of FIG. 6B, the electronic device 700 of FIG. 7, the electronic device 800 of FIG. 8, the electronic device 900 of FIG. 9, the electronic device 1000 of FIG. 10, or the electronic device 1100 of FIG. 11) may include at least one sensor (e.g., the sensor module 176 of FIG. 1, the at least one sensor 510 of FIG. 5, or the sensor 603 of FIG. 6A or 6B), a display (e.g., the display module 160 of FIG. 1, the display 204 of FIG. 2, or the display 520 of FIG. 5), a memory (e.g., the memory 130 of FIG. 1, the memory 205 of FIG. 2, or the memory 530 of FIG. 5), and a processor (e.g., the processor 120 of FIG. 1, the processor 206 of FIG. 2, or the processor 540 of FIG. 5) operatively connected to the at least one sensor, the display, and the memory. According to an embodiment, the memory may store instructions that, when executed, cause the processor to recognize a context of a user by using the at least one sensor based on at least one of a speed of the electronic device, a location of the electronic device, a level of external noise, an external illuminance, personal information of the user, or a connection state between the electronic device and an external electronic device, and to control an execution environment of a voice assistant application based on the recognized context.

According to an embodiment, the execution environment may include at least one of a reference value for recognizing a command of the user for executing the voice assistant application, a transparency of a layer displayed on the display, whether to release the layer displayed on the display, a size of a text displayed on the display, a brightness of the display, or a volume of a sound device included in the electronic device.

According to an embodiment, when the recognized context corresponds to a driving mode, the instructions may cause the processor to adjust the reference value for recognizing the command of the user and to execute the voice assistant application relatively sensitively in response to the command of the user based on the adjusted reference value.

According to an embodiment, the instructions may cause the processor to display a second layer associated with the voice assistant application on the display in a state where the first layer is overlaid with the second layer upon receiving the command of the user while a first layer associated with a first application is displayed on the display, to wait for a user utterance during a first time while the first layer is overlaid with the second layer, to receive the user utterance during a second time while the first layer is overlaid with the second layer, and to control the transparency of the second layer when the recognized context corresponds to a driving mode, while the first layer is overlaid with the second layer.

According to an embodiment, the instructions may cause the processor to set the first time to be longer than a predetermined waiting time when the recognized context corresponds to a driving mode.

According to an embodiment, when the recognized context corresponds to a driving mode, the instructions may cause the processor to remove the second layer from the display in response to the user utterance, to perform a task corresponding to the user utterance, to display a third layer including a result of performing the task on the display during a specified time, and to display the first layer on the display by removing the third layer from the display after the specified time.

According to an embodiment, the instructions may cause the processor to set the size of the text to be greater than a predetermined text size when the recognized context corresponds to a driving mode.

According to an embodiment, the instructions may cause the processor to set the brightness of the display to be greater than a predetermined brightness when the recognized context corresponds to a driving mode.

According to an embodiment, the instructions may cause the processor to set the volume to be greater than a predetermined volume when the recognized context corresponds to a driving mode.

According to an embodiment, the instructions may cause the processor to adjust the reference value for recognizing the command of the user, recognize the command of the user at relatively-high sensitivity, and execute the voice assistant application when the recognized context corresponds to a high-noise environment and to adjust the reference value for recognizing the command of the user, to recognize the command of the user at relatively-low sensitivity, and to execute the voice assistant application when the recognized context corresponds to a low-noise environment.

According to an embodiment, the instructions may cause the processor to respond the command of the user relatively sensitively by adjusting the reference value for recognizing the command of the user, based on an event that a second application is running.

According to an embodiment, the instructions may cause the processor to set the size of the text to be greater than a predetermined text size based on the event that the second application is running, and to set the volume to be greater than a predetermined volume.

According to an embodiment, the second application may include at least one of a music application, an exercise application, or a cooking application.

According to an embodiment, on a basis of the personal information, the instructions may cause the processor to set the volume to be smaller than a predetermined volume and to set the brightness of the display to be smaller than a predetermined brightness.

According to an embodiment, on a basis of the personal information, the instructions may cause the processor to provide the user with schedule information by executing a capsule associated with a schedule of the user.

According to an embodiment, the instructions may cause the processor to determine that the context corresponds to a driving mode when the speed of the electronic device exceeds a reference speed or the electronic device is connected to the external electronic device, and to execute a driving application or provide the user with driving information on a basis of the driving mode.

Figure 12:
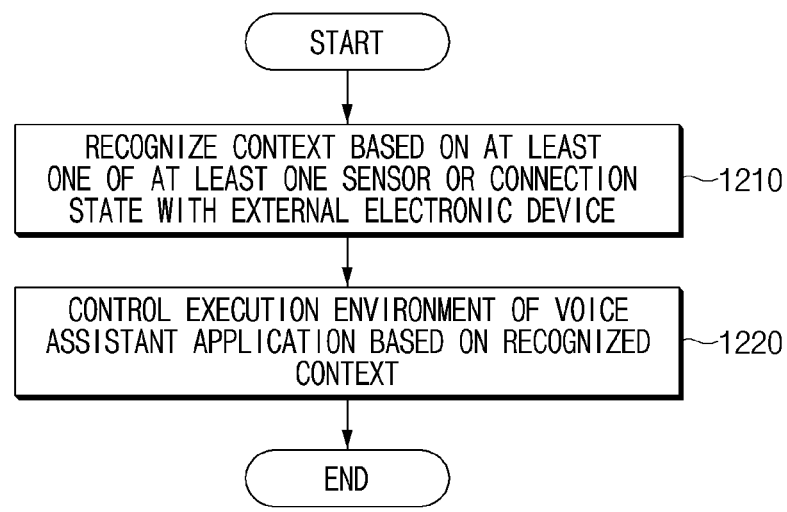
FIG. 12 illustrates a flowchart of an operating method of an electronic device, according to various embodiments.

FIG. 12 illustrates a flowchart of an operating method of an electronic device, according to various embodiments.

According to an embodiment, in operation 1210, an electronic device (e.g., the electronic device 101 of FIG. 1, the user terminal 200a of FIG. 2, the electronic device 500 of FIG. 5, the electronic device 610 of FIG. 6A, the electronic device 620 of FIG. 6B, the electronic device 700 of FIG. 7, the electronic device 800 of FIG. 8, the electronic device 900 of FIG. 9, the electronic device 1000 of FIG. 10, or the electronic device 1100 of FIG. 11) may recognize a context of an electronic device or a user's context, based on at least one of information obtained through at least one sensor or a connection state between the electronic device and the external electronic device. For example, the at least one sensor may include at least one of a location sensor, a gyro sensor, a magnetic sensor, an acceleration sensor, a temperature sensor, a humidity sensor, an illuminance sensor, or a noise sensor that detects a level of external noise.

According to an embodiment, the electronic device may measure a level of external noise through at least one sensor, and then recognize whether the context corresponds among a high-noise environment or a low-noise environment, based on the measured level of external noise. According to an embodiment, the electronic device may recognize to which the context corresponds among 'driving mode', 'home', 'workplace', or 'school', based on at least one sensor or the connection state with the external electronic device. For example, when a moving speed of the electronic device exceeds a reference speed, or the electronic device is executing a driving-related application, the electronic device may recognize that the user's context corresponds to a driving mode. According to an embodiment, the electronic device may recognize to which the context of the user of the electronic device corresponds among a bedtime or a wake-up time, based on the user's personal information. According to an embodiment, the electronic device may recognize which situation the user is in, based on the running application. For example, when the electronic device is executing a cooking application, the electronic device may recognize that the user is cooking food.

According to an embodiment, in operation 1220, the electronic device may control an execution environment of the voice assistant application based on the recognized context.

According to an embodiment, when the recognized context corresponds to the driving mode, the electronic device may control the execution environment of the voice assistant application so as to be optimized for the driving mode. For example, the electronic device may adjust sensitivity (or a reference value for recognizing the user's command) at which the user's command for executing the voice assistant application is recognized. For example, the electronic device may set the sensitivity at which the user's command for executing the voice assistant application is recognized. Even though a command is received from a user, of which the pronunciation has relatively-low accuracy, or the user's command having a relatively-small volume is received, the electronic device may execute the voice assistant application. For example, the electronic device may control a transparency of a layer associated with the voice assistant application such that the user is capable of recognizing content of a running first application (e.g., a navigation application). For example, the electronic device may set a time for receiving a user utterance from a user to be longer than a predetermined waiting time. For example, the electronic device may display a layer including a result of performing a task in the voice assistant application, on the display during a specified time and may release (or remove) the layer including the task result from the display after a specified time has elapsed. The electronic device may release (or remove) the layer including the task result, and then may display a layer of the first application on the display without receiving an additional input from the user.

According to an embodiment, when the recognized context corresponds to the user's bedtime, the electronic device may set a brightness of the display to be smaller than a predetermined brightness or set a volume of a sound device included in the electronic device to be smaller than a predetermined volume. According to an embodiment, when the recognized context corresponds to the user's wake-up time, the electronic device may set the brightness of the display not to be smaller than the predetermined brightness or set the volume of the sound device included in the electronic device not to be smaller than the predetermined volume. The electronic device may display a task execution result of the voice assistant application on the display depending on the set brightness of the display. The electronic device may determine a volume of a response voice of the voice assistant application depending on the set volume of the sound device.

According to an embodiment, when the running application is associated with cooking, the electronic device may control the execution environment of the voice assistant application to be optimized for a state of the user that is cooking food. For example, the electronic device may adjust sensitivity (or a reference value for recognizing the user's command) at which the user's command for executing the voice assistant application is recognized. For example, the electronic device may set the sensitivity at which the user's command for executing the voice assistant application is recognized. Even though a command is received from a user, of which the pronunciation has relatively-low accuracy, or the user's command having a relatively-small volume is received, the electronic device may execute the voice assistant application. For example, the electronic device may set a time for receiving a user utterance from a user to be longer than a predetermined waiting time. For example, the electronic device may display a result (e.g., recipe), in which the voice assistant application performs a task, on the display during a time longer than a specified display time. For example, the electronic device may set the brightness of the display to be greater than the predetermined brightness or may set a text size to be greater than a predetermined text size. Accordingly, the electronic device may allow the user to easily recognize content displayed on the display. In addition to the above-described embodiments, the electronic device according to an embodiment may control an execution environment of the voice assistant application or a setting value of the electronic device based on a context of the electronic device or the user's context.

According to an embodiment of the disclosure, an operating method of an electronic device (e.g., the electronic device 101 of FIG. 1, the user terminal 200a of FIG. 2, the electronic device 500 of FIG. 5, the electronic device 610 of FIG. 6A, the electronic device 620 of FIG. 6B, the electronic device 700 of FIG. 7, the electronic device 800 of FIG. 8, the electronic device 900 of FIG. 9, the electronic device 1000 of FIG. 10, or the electronic device 1100 of FIG. 11) may include recognizing a context of the user by using at least one sensor based on at least one of a speed of the electronic device, a location of the electronic device, a level of external noise, an external illuminance, personal information of the user, or a connection state between the electronic device and an external electronic device and controlling an execution environment of a voice assistant application based on the recognized context.

According to an embodiment, the controlling of the execution environment may include controlling at least one of a reference value for recognizing a command of the user for executing the voice assistant application, a transparency of a layer displayed on a display included in the electronic device, whether to release the layer displayed on the display, a size of a text displayed on the display, a brightness of the display, or a volume of a sound device included in the electronic device.

According to an embodiment, when the recognized context corresponds to a driving mode, the controlling of the at least one may include adjusting the reference value for recognizing the command of the user and executing the voice assistant application relatively sensitively in response to the command of the user based on the adjusted reference value.

According to an embodiment, when the recognized context corresponds to a driving mode, the controlling of the at least one may include displaying a second layer on the display in a state where the first layer is overlaid with the second layer, by executing the voice assistant application upon receiving the command of the user while a first layer associated with a first application is displayed on the display, controlling the transparency of the second layer while the first layer is overlaid with the second layer, waiting for a user utterance during a first time while the transparency of the second layer is controlled, and receiving the user utterance during a second time while the transparency of the second layer is controlled.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and then execute the stored instruction(s). This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities and some of the plurality entities may be separately disposed in another component. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

The invention claimed is:

1. An electronic device comprising:
at least one sensor;
a display;
a memory; and
a processor operatively connected to the at least one sensor, the display, and the memory,
wherein the memory stores instructions that, when executed, the processor is configured to:
obtain information associated with a context of a user or the electronic device by using the at least one sensor, wherein the information includes at least one of a speed of the electronic device, a location of the electronic device, a level of external noise, an external illuminance, personal information of a user, or a connection state between the electronic device and an external electronic device,
identify the context of the user or the electronic device based on the information,
execute a first application corresponding to the context,
determine an execution environment of a voice assistant application based on the context, and
execute the voice assistant application based on the determined execution environment.

2. The electronic device of claim 1, wherein the execution environment includes at least one of:
a reference value for recognizing a command of the user for executing the voice assistant application, a transparency of a layer associated with the voice assistant application displayed on the display, whether to release the layer associated with the voice assistant application displayed on the display, a size of a text displayed on the display, a brightness of the display, or a volume of a sound device included in the electronic device.

3. The electronic device of claim 2, wherein when the context corresponds to a driving mode, the processor is configured to:
adjust the reference value for recognizing the command of the user; and
execute the voice assistant application relatively sensitively in response to the command of the user based on the adjusted reference value.

4. The electronic device of claim 2, wherein the processor is further configured to:
upon receiving the command of the user while a first layer associated with the first application is displayed on the display, display a second layer associated with the voice assistant application on the display in a state where the first layer is overlaid with the second layer;
while the first layer is overlaid with the second layer, wait for a user utterance during a first time;
while the first layer is overlaid with the second layer, receive the user utterance during a second time; and
when the context corresponds to a driving mode, while the first layer is overlaid with the second layer, determine the transparency of the second layer.

5. The electronic device of claim 4, wherein when the context corresponds to the driving mode, the processor is configured to:
set the first time to be longer than a predetermined waiting time.

6. The electronic device of claim 4, wherein when the context corresponds to the driving mode, the processor is configured to:
remove the second layer from the display in response to the user utterance;
perform a task corresponding to the user utterance;
display a third layer including a result of performing the task on the display during a specified time, wherein the third layer is overlaid on the first layer; and
remove the third layer from the display after the specified time so that the first layer is displayed on the display.

7. The electronic device of claim 2, wherein when the context corresponds to a driving mode, the processor is configured to:
set the size of the text to be greater than a predetermined text size.

8. The electronic device of claim 2, wherein when the context corresponds to a driving mode, the processor is configured to:
set the brightness of the display to be greater than a predetermined brightness.

9. The electronic device of claim 2, wherein when the context corresponds to a driving mode, the processor is configured to:
set the volume to be greater than a predetermined volume.

10. The electronic device of claim 2, wherein:
when the context corresponds to a high-noise environment, the processor is configured to adjust the reference value for recognizing the command of the user, recognize the command of the user at relatively-high sensitivity, and execute the voice assistant application; and
when the context corresponds to a low-noise environment, the processor is configured to adjust the reference value for recognizing the command of the user, recognize the command of the user at relatively-low sensitivity, and execute the voice assistant application.

11. The electronic device of claim 2, wherein the processor is further configured to:
respond the command of the user relatively sensitively by adjusting the reference value for recognizing the command of the user, based on at least one of a music application, an exercise application, or a cooking application being running.

12. The electronic device of claim 11, wherein the processor is further configured to:
set the size of the text to be greater than a predetermined text size based on at least one of the music application, the exercise application, or the cooking application being running; and
set the volume to be greater than a predetermined volume.

13. The electronic device of claim 2, wherein when the context is based on the personal information, the processor is configured to:
set the volume to be smaller than a predetermined volume; and
set the brightness of the display to be smaller than a predetermined brightness.

14. The electronic device of claim 1, wherein when the context is based on the personal information, the processor is configured to:
provide the user with schedule information by executing a capsule associated with a schedule of the user.

15. The electronic device of claim 1, wherein when the speed of the electronic device exceeds a reference speed or the electronic device is connected to a specified external electronic device, the processor is configured to:
determine that the context corresponds to a driving mode; and
in response to determining that the context corresponds to the driving mode, execute a driving application or provide the user with driving information.

16. An operating method of an electronic device, the method comprising:
obtaining information associated with a context of a user or the electronic device, wherein the information includes at least one of a speed of the electronic device, a location of the electronic device, a level of external noise, an external illuminance, personal information of the user, or a connection state between the electronic device and an external electronic device;
identifying the context of the user or the electronic device based on the information;
executing a first application corresponding to the context;
determining an execution environment of a voice assistant application based on the context; and
executing the voice assistant application based on the determined execution environment.

17. The method of claim 16, wherein determining the execution environment comprises:
determining at least one of a reference value for recognizing a command of the user for executing the voice assistant application, a transparency of a layer associated with the voice assistant application displayed on a display included in the electronic device, whether to release the layer associated with the voice assistant application displayed on the display, a size of a text displayed on the display, a brightness of the display, or a volume of a sound device included in the electronic device.

18. The method of claim 17, wherein when the context corresponds to a driving mode, the method comprises:
adjusting the reference value for recognizing the command of the user; and
executing the voice assistant application relatively sensitively in response to the command of the user based on the adjusted reference value.

19. The method of claim 17, wherein when the context corresponds to a driving mode and upon receiving the command of the user while a first layer associated with the first application is displayed on the display, the method comprises:
displaying a second layer on the display in a state where the first layer is overlaid with the second layer, by executing the voice assistant application;
while the first layer is overlaid with the second layer, determining the transparency of the second layer based on the context;
while the transparency of the second layer is determined, waiting for a user utterance during a first time; and
while the transparency of the second layer is determined, receiving the user utterance during a second time.

* * * * *